US008904477B2

(12) United States Patent
Barton et al.

(10) Patent No.: US 8,904,477 B2
(45) Date of Patent: Dec. 2, 2014

(54) CONFIGURING AND PROVIDING PROFILES THAT MANAGE EXECUTION OF MOBILE APPLICATIONS

(71) Applicant: Citrix Systems, Inc., Fort Lauderdale, FL (US)

(72) Inventors: Gary Barton, Boca Raton, FL (US); Zhongmin Lang, Parkland, FL (US); Nitin Desai, Coral Springs, FL (US); James Robert Walker, Deerfield Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 14/041,946

(22) Filed: Sep. 30, 2013

(65) Prior Publication Data
US 2014/0108649 A1    Apr. 17, 2014

Related U.S. Application Data

(63) Continuation of application No. 14/039,651, filed on Sep. 27, 2013.

(60) Provisional application No. 61/863,194, filed on Aug. 7, 2013, provisional application No. 61/713,715, filed on Oct. 15, 2012, provisional application No. 61/806,577, filed on Mar. 29, 2013.

(51) Int. Cl.
*G06F 17/00* (2006.01)
*H04W 8/18* (2009.01)
(Continued)

(52) U.S. Cl.
CPC .............. *G06F 21/604* (2013.01); *H04W 8/18* (2013.01); *G06F 21/6218* (2013.01);
(Continued)

(58) Field of Classification Search
USPC ............... 726/1, 2, 26; 455/410; 709/223; 380/270
See application file for complete search history.

(56) References Cited

U.S. PATENT DOCUMENTS

| 5,805,803 A | 9/1998 | Birrell et al. |
| 6,151,606 A | 11/2000 | Mendez |

(Continued)

FOREIGN PATENT DOCUMENTS

| EP | 1465039 A1 | 10/2004 |
| EP | 2428894 A1 | 3/2012 |

(Continued)

OTHER PUBLICATIONS

Notice of Allowance issued in corresponding U.S. Appl. No. 14/041,923, mailed Dec. 23, 2013.

(Continued)

*Primary Examiner* — Saleh Najjar
*Assistant Examiner* — Peiliang Pan
(74) *Attorney, Agent, or Firm* — Banner & Witcoff, Ltd.

(57) ABSTRACT

Various aspects of the disclosure relate to configuring and providing policies that manage execution of mobile applications. In some embodiments, a user interface may be generated that allows an IT administrator or other operator to set, change and/or add to policy settings. The policy settings can be formatted into a policy file and be made available for download to a mobile device, such as via an application store or to be pushed to the mobile device as part of a data push service. The mobile device, based on the various settings included in the policy file, may perform various actions to enforce the security constraints that are represented by the policy. The various settings that can be included in a policy are numerous and some examples and variations thereof are described in connection with the example embodiments discussed herein.

20 Claims, 21 Drawing Sheets

(51) Int. Cl.
    *G06F 21/62* (2013.01)
    *G06F 21/60* (2013.01)
    *G06F 21/88* (2013.01)
    *H04L 29/08* (2006.01)

(52) U.S. Cl.
    CPC .............. *G06F 21/88* (2013.01); *H04L 67/34* (2013.01); *G06F 2221/2143* (2013.01)
    USPC ................ 726/1; 726/2; 726/26; 380/270

(56) References Cited

U.S. PATENT DOCUMENTS

| | | |
|---|---|---|
| 6,154,172 A | 11/2000 | Piccionelli et al. |
| 6,609,198 B1 | 8/2003 | Wood et al. |
| 6,621,766 B2 | 9/2003 | Brewer et al. |
| 6,751,738 B2 | 6/2004 | Wesinger, Jr. et al. |
| 6,859,879 B2 | 2/2005 | Henn et al. |
| 6,883,098 B1 | 4/2005 | Roman et al. |
| 7,043,453 B2 | 5/2006 | Stefik et al. |
| 7,159,120 B2 | 1/2007 | Muratov et al. |
| 7,240,015 B1 | 7/2007 | Karmouch et al. |
| 7,254,831 B2 | 8/2007 | Saunders et al. |
| 7,269,605 B1 | 9/2007 | Nguyen et al. |
| 7,340,772 B2 | 3/2008 | Panasyuk et al. |
| 7,415,498 B2 | 8/2008 | Russo et al. |
| 7,490,073 B1 | 2/2009 | Qureshi et al. |
| 7,496,954 B1 | 2/2009 | Himawan et al. |
| 7,509,672 B1 | 3/2009 | Horwitz et al. |
| 7,526,800 B2 | 4/2009 | Wright et al. |
| 7,529,923 B2 | 5/2009 | Chartrand et al. |
| 7,596,593 B2 | 9/2009 | Mitchell et al. |
| 7,599,991 B2 | 10/2009 | Vargas et al. |
| 7,697,737 B2 | 4/2010 | Aull et al. |
| 7,761,523 B2 | 7/2010 | May et al. |
| 7,779,458 B1 | 8/2010 | Heiderscheit et al. |
| 7,788,535 B2 | 8/2010 | Bussa et al. |
| 7,788,536 B2 | 8/2010 | Qureshi et al. |
| 7,865,888 B1 | 1/2011 | Qureshi et al. |
| 7,904,468 B2 | 3/2011 | Neil et al. |
| 7,950,066 B1 | 5/2011 | Zuili |
| 7,966,323 B2 | 6/2011 | Bocking et al. |
| 7,966,652 B2 | 6/2011 | Ganesan |
| 7,970,386 B2 | 6/2011 | Bhat et al. |
| 8,001,278 B2 | 8/2011 | Huggahalli et al. |
| 8,012,219 B2 | 9/2011 | Mendez et al. |
| 8,037,421 B2 | 10/2011 | Scott et al. |
| 8,051,180 B2 | 11/2011 | Mazzaferri et al. |
| 8,060,074 B2 | 11/2011 | Danford et al. |
| 8,085,891 B2 | 12/2011 | Owen |
| 8,095,786 B1 | 1/2012 | Kshirsagar et al. |
| 8,126,128 B1 | 2/2012 | Hicks, III et al. |
| 8,126,506 B2 | 2/2012 | Roundtree |
| 8,181,010 B1 | 5/2012 | Uchil et al. |
| 8,214,887 B2 | 7/2012 | Clark et al. |
| 8,238,256 B2 | 8/2012 | Nugent |
| 8,239,918 B1 | 8/2012 | Cohen |
| 8,272,030 B1 * | 9/2012 | Annan et al. ..................... 726/1 |
| 8,296,239 B2 | 10/2012 | Nonaka |
| 8,332,464 B2 | 12/2012 | Dispensa et al. |
| 8,359,016 B2 | 1/2013 | Lindeman et al. |
| 8,365,258 B2 | 1/2013 | Dispensa |
| 8,365,266 B2 | 1/2013 | Bogner |
| 8,402,011 B1 | 3/2013 | Bodenhamer |
| 8,418,238 B2 | 4/2013 | Platt et al. |
| 8,463,946 B2 | 6/2013 | Ferguson et al. |
| 8,468,090 B2 | 6/2013 | Lesandro et al. |
| 8,468,455 B2 | 6/2013 | Jorgensen et al. |
| 8,528,059 B1 | 9/2013 | Labana et al. |
| 8,560,709 B1 | 10/2013 | Shokhor et al. |
| 8,578,443 B2 | 11/2013 | Narain et al. |
| 8,601,562 B2 | 12/2013 | Milas |
| 8,613,070 B1 | 12/2013 | Borzycki et al. |
| 8,650,620 B2 | 2/2014 | Chawla et al. |
| 2002/0112047 A1 | 8/2002 | Kushwaha et al. |
| 2003/0031319 A1 | 2/2003 | Abe et al. |
| 2003/0037103 A1 | 2/2003 | Salmi et al. |
| 2003/0046366 A1 | 3/2003 | Pardikar et al. |
| 2003/0065947 A1 | 4/2003 | Song et al. |
| 2003/0131245 A1 | 7/2003 | Linderman |
| 2004/0006706 A1 | 1/2004 | Erlingsson |
| 2004/0010579 A1 | 1/2004 | Freese |
| 2004/0083273 A1 | 4/2004 | Madison et al. |
| 2004/0111640 A1 | 6/2004 | Baum |
| 2004/0205233 A1 | 10/2004 | Dunk |
| 2004/0230807 A1 | 11/2004 | Baird et al. |
| 2005/0055578 A1 * | 3/2005 | Wright et al. .................. 713/201 |
| 2005/0076085 A1 | 4/2005 | Budd et al. |
| 2005/0097608 A1 | 5/2005 | Penke et al. |
| 2005/0172241 A1 | 8/2005 | Daniels et al. |
| 2005/0255838 A1 | 11/2005 | Adams et al. |
| 2005/0273592 A1 | 12/2005 | Pryor et al. |
| 2006/0075123 A1 | 4/2006 | Burr et al. |
| 2006/0085826 A1 | 4/2006 | Funk et al. |
| 2006/0094400 A1 | 5/2006 | Beachem et al. |
| 2006/0117104 A1 | 6/2006 | Taniguchi et al. |
| 2006/0120526 A1 | 6/2006 | Boucher et al. |
| 2006/0141985 A1 * | 6/2006 | Patel et al. ..................... 455/410 |
| 2006/0147043 A1 | 7/2006 | Mann et al. |
| 2006/0161635 A1 | 7/2006 | Lamkin et al. |
| 2006/0224742 A1 | 10/2006 | Shahbazi |
| 2006/0225142 A1 | 10/2006 | Moon |
| 2006/0242685 A1 | 10/2006 | Heard et al. |
| 2007/0005713 A1 | 1/2007 | LeVasseur et al. |
| 2007/0011749 A1 | 1/2007 | Allison et al. |
| 2007/0038764 A1 | 2/2007 | Maillard |
| 2007/0049297 A1 | 3/2007 | Gopalan et al. |
| 2007/0054627 A1 | 3/2007 | Wormald |
| 2007/0056043 A1 | 3/2007 | Onyon et al. |
| 2007/0074033 A1 | 3/2007 | Adams et al. |
| 2007/0109983 A1 | 5/2007 | Shankar et al. |
| 2007/0156897 A1 | 7/2007 | Lim |
| 2007/0180447 A1 | 8/2007 | Mazzaferri et al. |
| 2007/0186106 A1 | 8/2007 | Ting et al. |
| 2007/0198656 A1 | 8/2007 | Mazzaferri et al. |
| 2007/0199051 A1 | 8/2007 | Parikh et al. |
| 2007/0204153 A1 | 8/2007 | Tome et al. |
| 2007/0204166 A1 | 8/2007 | Tome et al. |
| 2007/0214272 A1 | 9/2007 | Isaacson |
| 2007/0226225 A1 | 9/2007 | Yiu et al. |
| 2007/0226773 A1 | 9/2007 | Pouliot |
| 2007/0248085 A1 | 10/2007 | Volpano |
| 2008/0027982 A1 | 1/2008 | Subramanian et al. |
| 2008/0047015 A1 | 2/2008 | Cornwall et al. |
| 2008/0052395 A1 | 2/2008 | Wright et al. |
| 2008/0066020 A1 | 3/2008 | Boss et al. |
| 2008/0066177 A1 | 3/2008 | Bender |
| 2008/0070495 A1 | 3/2008 | Stricklen et al. |
| 2008/0127292 A1 | 5/2008 | Cooper et al. |
| 2008/0133729 A1 | 6/2008 | Fridman et al. |
| 2008/0134292 A1 | 6/2008 | Ariel et al. |
| 2008/0141335 A1 | 6/2008 | Thomas |
| 2008/0163286 A1 | 7/2008 | Rudolph et al. |
| 2008/0196038 A1 | 8/2008 | Antonio et al. |
| 2008/0209506 A1 | 8/2008 | Ghai et al. |
| 2008/0214300 A1 | 9/2008 | Williams et al. |
| 2008/0235760 A1 | 9/2008 | Broussard et al. |
| 2008/0313648 A1 | 12/2008 | Wang et al. |
| 2008/0318616 A1 | 12/2008 | Chipalkatti et al. |
| 2009/0006232 A1 | 1/2009 | Gallagher et al. |
| 2009/0028049 A1 | 1/2009 | Boudreau et al. |
| 2009/0030968 A1 | 1/2009 | Boudreau et al. |
| 2009/0037976 A1 | 2/2009 | Teo et al. |
| 2009/0077638 A1 | 3/2009 | Norman et al. |
| 2009/0119773 A1 | 5/2009 | D'Amore et al. |
| 2009/0170532 A1 | 7/2009 | Lee et al. |
| 2009/0172789 A1 | 7/2009 | Band et al. |
| 2009/0178111 A1 | 7/2009 | Moriconi et al. |
| 2009/0199277 A1 | 8/2009 | Norman et al. |
| 2009/0221278 A1 | 9/2009 | Spelta et al. |
| 2009/0222880 A1 | 9/2009 | Mayer et al. |
| 2009/0228714 A1 | 9/2009 | Fiske et al. |
| 2009/0228954 A1 | 9/2009 | Hu et al. |
| 2009/0228963 A1 | 9/2009 | Pearce et al. |
| 2009/0249359 A1 | 10/2009 | Caunter et al. |

(56) References Cited

U.S. PATENT DOCUMENTS

| | | |
|---|---|---|
| 2009/0325615 A1 | 12/2009 | McKay et al. |
| 2010/0077469 A1 | 3/2010 | Furman et al. |
| 2010/0100825 A1 | 4/2010 | Sharoni |
| 2010/0100925 A1 | 4/2010 | Hinton |
| 2010/0124196 A1 | 5/2010 | Bonar et al. |
| 2010/0146523 A1 | 6/2010 | Brigaut et al. |
| 2010/0150341 A1 | 6/2010 | Dodgson et al. |
| 2010/0154025 A1 | 6/2010 | Esteve Balducci et al. |
| 2010/0192212 A1 | 7/2010 | Raleigh |
| 2010/0229197 A1 | 9/2010 | Yi et al. |
| 2010/0248699 A1 | 9/2010 | Dumais |
| 2010/0287619 A1 | 11/2010 | Chase |
| 2010/0299152 A1 | 11/2010 | Batchu et al. |
| 2010/0299376 A1 | 11/2010 | Batchu et al. |
| 2010/0317336 A1 | 12/2010 | Ferren et al. |
| 2010/0319053 A1 | 12/2010 | Gharabally |
| 2010/0325097 A1 | 12/2010 | Er et al. |
| 2010/0333165 A1 | 12/2010 | Basak et al. |
| 2011/0145833 A1 | 6/2011 | De Los Reyes et al. |
| 2011/0154477 A1 | 6/2011 | Parla et al. |
| 2011/0179484 A1 | 7/2011 | Tuvell et al. |
| 2011/0208838 A1 | 8/2011 | Thomas et al. |
| 2011/0209064 A1 | 8/2011 | Jorgensen et al. |
| 2011/0219124 A1 | 9/2011 | Allen et al. |
| 2011/0225417 A1 | 9/2011 | Maharajh et al. |
| 2011/0239125 A1 | 9/2011 | Kristensen et al. |
| 2011/0252232 A1 | 10/2011 | De Atley et al. |
| 2011/0258301 A1 | 10/2011 | McCormick et al. |
| 2011/0271279 A1 | 11/2011 | Pate |
| 2011/0276683 A1 | 11/2011 | Goldschlag et al. |
| 2011/0276699 A1 | 11/2011 | Pedersen |
| 2011/0295970 A1 | 12/2011 | Miyazawa |
| 2012/0005476 A1 | 1/2012 | Wei et al. |
| 2012/0005724 A1 | 1/2012 | Lee |
| 2012/0005745 A1 | 1/2012 | Wei et al. |
| 2012/0005746 A1 | 1/2012 | Wei et al. |
| 2012/0023506 A1 | 1/2012 | Maeckel et al. |
| 2012/0036347 A1 | 2/2012 | Swanson et al. |
| 2012/0036370 A1 | 2/2012 | Lim et al. |
| 2012/0052954 A1 | 3/2012 | Zhu et al. |
| 2012/0066691 A1 | 3/2012 | Branton |
| 2012/0079475 A1 | 3/2012 | Hicks, III et al. |
| 2012/0084184 A1 | 4/2012 | Raleigh et al. |
| 2012/0088540 A1 | 4/2012 | Smith et al. |
| 2012/0096533 A1 | 4/2012 | Boulos et al. |
| 2012/0109384 A1 | 5/2012 | Stepanian |
| 2012/0117622 A1 | 5/2012 | Gronholm et al. |
| 2012/0129503 A1 | 5/2012 | Lindeman et al. |
| 2012/0131116 A1 | 5/2012 | Tu et al. |
| 2012/0131685 A1 | 5/2012 | Broch et al. |
| 2012/0154413 A1 | 6/2012 | Kim et al. |
| 2012/0157165 A1 | 6/2012 | Kim et al. |
| 2012/0157166 A1 | 6/2012 | Kim et al. |
| 2012/0159139 A1 | 6/2012 | Kim et al. |
| 2012/0165075 A1 | 6/2012 | Kim et al. |
| 2012/0166524 A1 | 6/2012 | Watakabe et al. |
| 2012/0166997 A1 | 6/2012 | Cho et al. |
| 2012/0167118 A1 | 6/2012 | Pingili et al. |
| 2012/0179802 A1 | 7/2012 | Narasimhan et al. |
| 2012/0179909 A1 | 7/2012 | Sagi et al. |
| 2012/0185910 A1 | 7/2012 | Miettinen et al. |
| 2012/0185913 A1 | 7/2012 | Martinez et al. |
| 2012/0198570 A1 | 8/2012 | Joa et al. |
| 2012/0204220 A1 | 8/2012 | Lavi |
| 2012/0214472 A1 | 8/2012 | Tadayon et al. |
| 2012/0222120 A1 | 8/2012 | Rim et al. |
| 2012/0233130 A1 | 9/2012 | Vedachalam et al. |
| 2012/0238257 A1 | 9/2012 | Anson |
| 2012/0240183 A1* | 9/2012 | Sinha ................ 726/1 |
| 2012/0254768 A1 | 10/2012 | Aggarwal et al. |
| 2012/0272221 A1 | 10/2012 | Pessoa et al. |
| 2012/0278454 A1 | 11/2012 | Stewart et al. |
| 2012/0284325 A1 | 11/2012 | Erb |
| 2012/0284779 A1 | 11/2012 | Ingrassia, Jr. et al. |
| 2012/0290694 A9 | 11/2012 | Marl et al. |
| 2012/0303476 A1 | 11/2012 | Krzyzanowski et al. |
| 2012/0303778 A1 | 11/2012 | Ahiska et al. |
| 2012/0304310 A1 | 11/2012 | Blaisdell |
| 2012/0311154 A1 | 12/2012 | Morgan |
| 2012/0311659 A1 | 12/2012 | Narain et al. |
| 2012/0324568 A1 | 12/2012 | Wyatt et al. |
| 2012/0331527 A1 | 12/2012 | Walters et al. |
| 2012/0331528 A1 | 12/2012 | Fu et al. |
| 2013/0002725 A1 | 1/2013 | Kim et al. |
| 2013/0007842 A1 | 1/2013 | Park et al. |
| 2013/0013653 A1 | 1/2013 | Thompson |
| 2013/0013688 A1 | 1/2013 | Wang et al. |
| 2013/0014239 A1 | 1/2013 | Pieczul et al. |
| 2013/0024424 A1 | 1/2013 | Prahlad et al. |
| 2013/0024928 A1 | 1/2013 | Burke et al. |
| 2013/0042294 A1 | 2/2013 | Colvin et al. |
| 2013/0054922 A1 | 2/2013 | Tuch et al. |
| 2013/0054962 A1 | 2/2013 | Chawla et al. |
| 2013/0055378 A1 | 2/2013 | Chang et al. |
| 2013/0059284 A1 | 3/2013 | Giedgowd, Jr. et al. |
| 2013/0066960 A1 | 3/2013 | Fieremans et al. |
| 2013/0074142 A1 | 3/2013 | Brennan et al. |
| 2013/0084847 A1 | 4/2013 | Tibbitts et al. |
| 2013/0086684 A1 | 4/2013 | Mohler |
| 2013/0091543 A1* | 4/2013 | Wade et al. ................ 726/1 |
| 2013/0097421 A1 | 4/2013 | Lim |
| 2013/0111540 A1 | 5/2013 | Sabin |
| 2013/0117240 A1 | 5/2013 | Taylor et al. |
| 2013/0117805 A1 | 5/2013 | Kent et al. |
| 2013/0130651 A1* | 5/2013 | Deasy et al. ............ 455/411 |
| 2013/0130652 A1 | 5/2013 | Deasy et al. |
| 2013/0132457 A1 | 5/2013 | Diwakar |
| 2013/0132941 A1 | 5/2013 | Lindeman et al. |
| 2013/0133061 A1 | 5/2013 | Fainkichen et al. |
| 2013/0138766 A1 | 5/2013 | Draluk et al. |
| 2013/0138810 A1 | 5/2013 | Binyamin et al. |
| 2013/0139241 A1 | 5/2013 | Leeder |
| 2013/0142043 A1 | 6/2013 | Tapia et al. |
| 2013/0145448 A1 | 6/2013 | Newell |
| 2013/0151598 A1 | 6/2013 | Fu et al. |
| 2013/0171967 A1 | 7/2013 | Ashour et al. |
| 2013/0212212 A1 | 8/2013 | Addepalli et al. |
| 2013/0219176 A1 | 8/2013 | Akella et al. |
| 2013/0219211 A1 | 8/2013 | Gopinath et al. |
| 2013/0219456 A1 | 8/2013 | Sharma et al. |
| 2013/0227659 A1 | 8/2013 | Raleigh |
| 2013/0232541 A1 | 9/2013 | Kapadia et al. |
| 2013/0254262 A1 | 9/2013 | Udall |
| 2013/0254660 A1 | 9/2013 | Fujioka |
| 2013/0254831 A1 | 9/2013 | Roach et al. |
| 2013/0263208 A1 | 10/2013 | Challa |
| 2013/0263209 A1 | 10/2013 | Panuganty |
| 2013/0291052 A1 | 10/2013 | Hadar et al. |
| 2013/0297604 A1 | 11/2013 | Sutedja et al. |
| 2013/0297662 A1 | 11/2013 | Sharma et al. |
| 2013/0298185 A1 | 11/2013 | Koneru et al. |
| 2013/0298201 A1 | 11/2013 | Aravindakshan et al. |
| 2013/0298242 A1 | 11/2013 | Kumar et al. |
| 2013/0303194 A1 | 11/2013 | Rowles |
| 2013/0311597 A1 | 11/2013 | Arrouye et al. |
| 2013/0318345 A1 | 11/2013 | Hengeveld |
| 2013/0333005 A1 | 12/2013 | Kim et al. |
| 2013/0346268 A1 | 12/2013 | Pereira et al. |
| 2014/0006347 A1 | 1/2014 | Qureshi et al. |
| 2014/0007183 A1* | 1/2014 | Qureshi et al. .............. 726/1 |
| 2014/0020062 A1 | 1/2014 | Tumula et al. |
| 2014/0020073 A1 | 1/2014 | Ronda et al. |
| 2014/0032691 A1 | 1/2014 | Barton et al. |
| 2014/0032733 A1 | 1/2014 | Barton et al. |
| 2014/0032758 A1 | 1/2014 | Barton et al. |
| 2014/0032759 A1 | 1/2014 | Barton et al. |
| 2014/0033271 A1 | 1/2014 | Barton et al. |
| 2014/0040638 A1 | 2/2014 | Barton et al. |
| 2014/0040656 A1 | 2/2014 | Ho et al. |
| 2014/0040977 A1 | 2/2014 | Barton et al. |
| 2014/0040978 A1 | 2/2014 | Barton et al. |
| 2014/0040979 A1 | 2/2014 | Barton et al. |

(56) References Cited

U.S. PATENT DOCUMENTS

| | | | |
|---|---|---|---|
| 2014/0059640 A9 | 2/2014 | Raleigh et al. |
| 2014/0059642 A1 | 2/2014 | Deasy et al. |

FOREIGN PATENT DOCUMENTS

| | | |
|---|---|---|
| GB | 2411320 A | 8/2005 |
| GB | 2462442 A | 2/2010 |
| WO | 9914652 A1 | 3/1999 |
| WO | 02084460 A2 | 10/2002 |
| WO | 2004107646 A1 | 12/2004 |
| WO | 2007113709 A1 | 10/2007 |
| WO | 2008086611 A1 | 7/2008 |
| WO | 2010115289 A1 | 10/2010 |

OTHER PUBLICATIONS

Lowe, "Application-Specific VPNs," Dec. 13, 2005.

International Search Report and Written Opinion mailed Nov. 26, 2013 in Internation Application No. PCT/US2013/060388.

Xuetao Wei, et al., "Malicious Android Applications in the Enterprise: What Do They Do and How Do We Fix It?,"• ICDE Workshop on Secure Data Management on Smartphones and Mobiles, Apr. 2012, 4 pages.

Ranjan et al., "Programming Cloud Resource Orchestration Framework: Operations and Research Challenges", arvix.org, 2012, pp. 1-19.

Na et al., "Personal Cloud Computing Security Framework," 2010 IEEE Asia-Pacific Computing Conference, 2010, pp. 671-675.

Wilson et al., "Unified Security Framework", In proceedings of the 1st International Symposium on Information and Communication Technologies, pp. 500-505. Trinity College Dublin, 2003.

Mysore et al., "The Liquid Media System—a Multi-Device Streaming Media Orchestration Framework", Ubicomp 2003 Workshop, pp. 1-4.

Written Opinion and International Search Report, PCT/US2013/062636, Jan. 10, 2014.

International Search Report and Written Opinion dated Feb. 4, 2014 in Application No. PCT/US2013/064349.

International Search Report and Written Opinion mailed Jan. 21, 2014 in International Application No. PCT/US2013/063856.

Apple Inc., iPad User Guide for iOS 6.1 Software, Jan. 2013, Chapter 26, Accessibility, pp. 107-108.

"Citrix XenMobile Technology Overview: White Paper," Citrix White Papers online, Jul. 31, 2012, pp. 1-14; retrieved from http://insight.com/content/aam/insight/en_US/pdfs/citrix/xenmobile-tech-overview.pdf, retrieved Jan. 27, 2014.

\* cited by examiner

CONFIGURING AND PROVIDING PROFILES THAT MANAGE EXECUTION OF MOBILE APPLICATIONS

CROSS-REFERENCE TO RELATED APPLICATIONS

This application is a continuation of and claims priority to: U.S. Non-Provisional patent application Ser. No. 14/039,651, filed Sep. 27, 2013, and entitled "CONFIGURING AND PROVIDING PROFILES THAT MANAGE EXECUTION OF MOBILE APPLICATIONS," which claims priority to U.S. Provisional Patent Application Ser. No. 61/863,194, filed Aug. 7, 2013, and entitled "CONFIGURING AND PROVIDING PROFILES THAT MANAGE EXECUTION OF MOBILE APPLICATIONS;" U.S. Provisional Patent Application Ser. No. 61/713,715, filed Oct. 15, 2012, and entitled "MANAGING DYNAMIC POLICIES AND SETTINGS FOR MOBILE APPLICATIONS;" and U.S. Provisional Patent Application Ser. No. 61/806,577, filed Mar. 29, 2013, and entitled "SYSTEMS AND METHODS FOR ENTERPRISE MOBILITY MANAGEMENT."

Each of the above-mentioned patent applications is incorporated by reference herein in its entirety.

BACKGROUND

Aspects of the disclosure relate to computer hardware and software. In particular, one or more aspects of the disclosure generally relate to computer hardware and software for providing an enterprise application store.

Increasingly, corporations and other organizations are providing and/or otherwise enabling their employees and other associates with mobile devices, such as smart phones, tablet computers, and other mobile computing devices. As these devices continue to grow in popularity and provide an increasing number of functions, many organizations may wish to place certain controls on how these devices can be used, what resources these devices can access, and how the applications running on these devices can interact with other resources.

SUMMARY

Aspects of the disclosure provide more efficient, effective, functional, and convenient ways of controlling how mobile devices can be used, what resources mobile devices can access, and how the applications running on these devices can interact with other resources. In particular, in one or more embodiments discussed in greater detail below, an enterprise application store may be implemented that can provide these and features.

Various aspects of the disclosure relate to configuring and providing one or more policies that can be used by a mobile to manage or constrain the execution of a mobile application (also referred herein as a managed application). In particular, some embodiments of this disclosure relate to systems, one or more apparatuses and one or more computing devices that are configured to perform various methods for configuring and providing the policies. For example, one or more computing devices may display a user interface that displays one or more policy settings for a managed application that is to be made available for download to a mobile device. Each of the one or more policy settings may provide a constraint to be enforced by the mobile device prior to the managed application being provided access to at least one resource that is accessible through an access gateway. The one or more computing devices may also receive input via the user interface that modifies the one or more policy settings, which can result in one or more modified policy settings. The one or more computing devices may further produce a policy file for the managed application that includes the one or more modified policy settings and provide the policy file such that the policy is available for download to the mobile device. The various settings that can be included in a policy are numerous and some examples and variations thereof are described in connection with the example embodiments discussed herein.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, various aspects of the disclosure relate to configuring and providing policies that manage execution of mobile applications. In some embodiments, a user interface may be generated that allows an IT administrator or other operator to set, change and/or add to policy settings. The policy settings can be formatted into a policy file, such as an Extensible Markup Language file (XML file), and be made available for download to a mobile device. The mobile device, based on the various settings included in the policy file, may perform various actions to enforce the security constraints that are represented by the policy. The various settings that can be included in a policy are numerous and some examples and variations thereof are described in connection with the example embodiments discussed herein.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
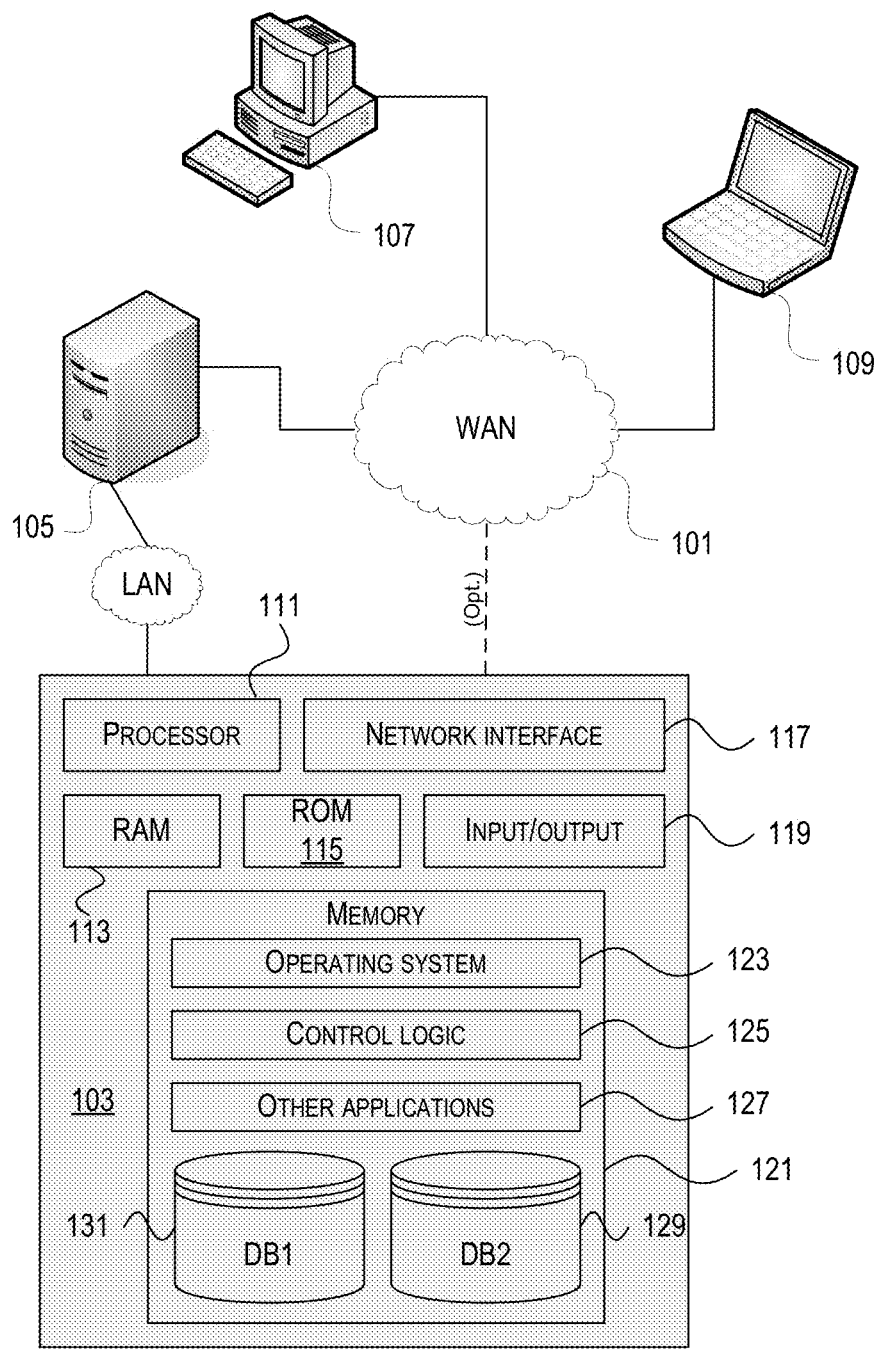
FIG. 1 depicts an illustrative computer system architecture that may be used in accordance with one or more aspects of the disclosure.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
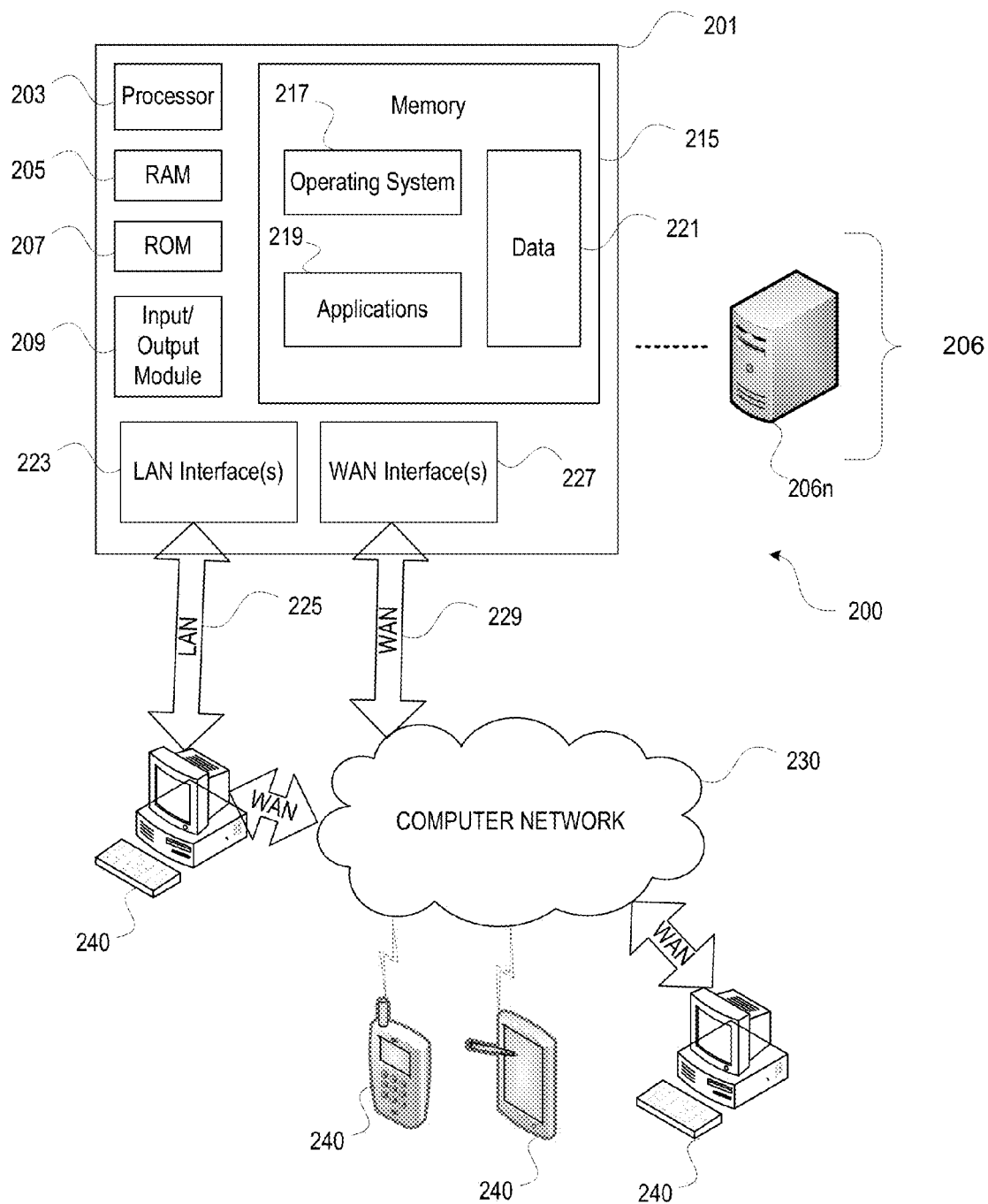
FIG. 2 depicts an illustrative remote-access system architecture that may be used in accordance with various aspects of the disclosure.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, mini-computers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
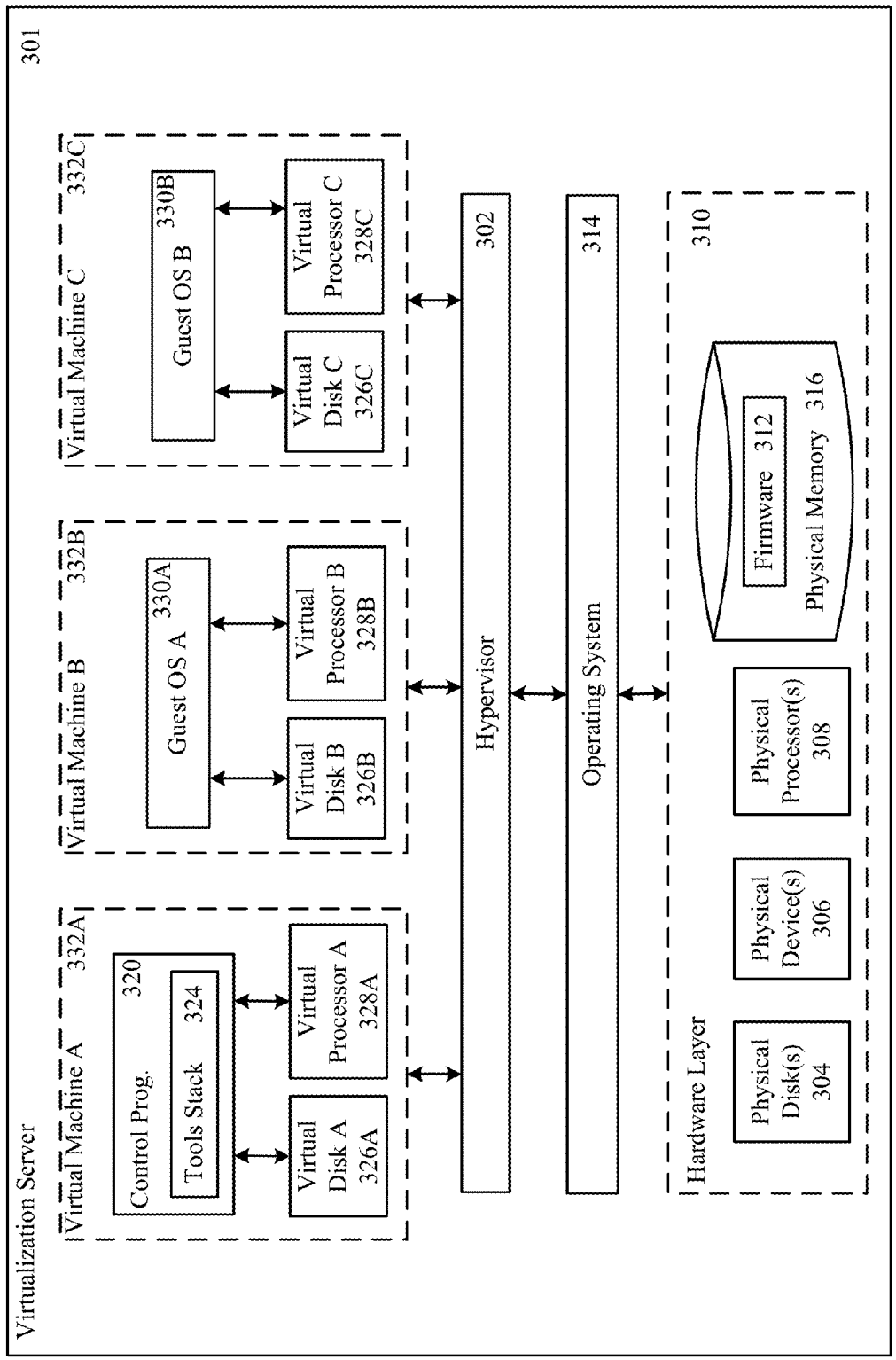
FIG. 3 depicts an illustrative virtualized (hypervisor) system architecture that may be used in accordance one or more aspects of the disclosure.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
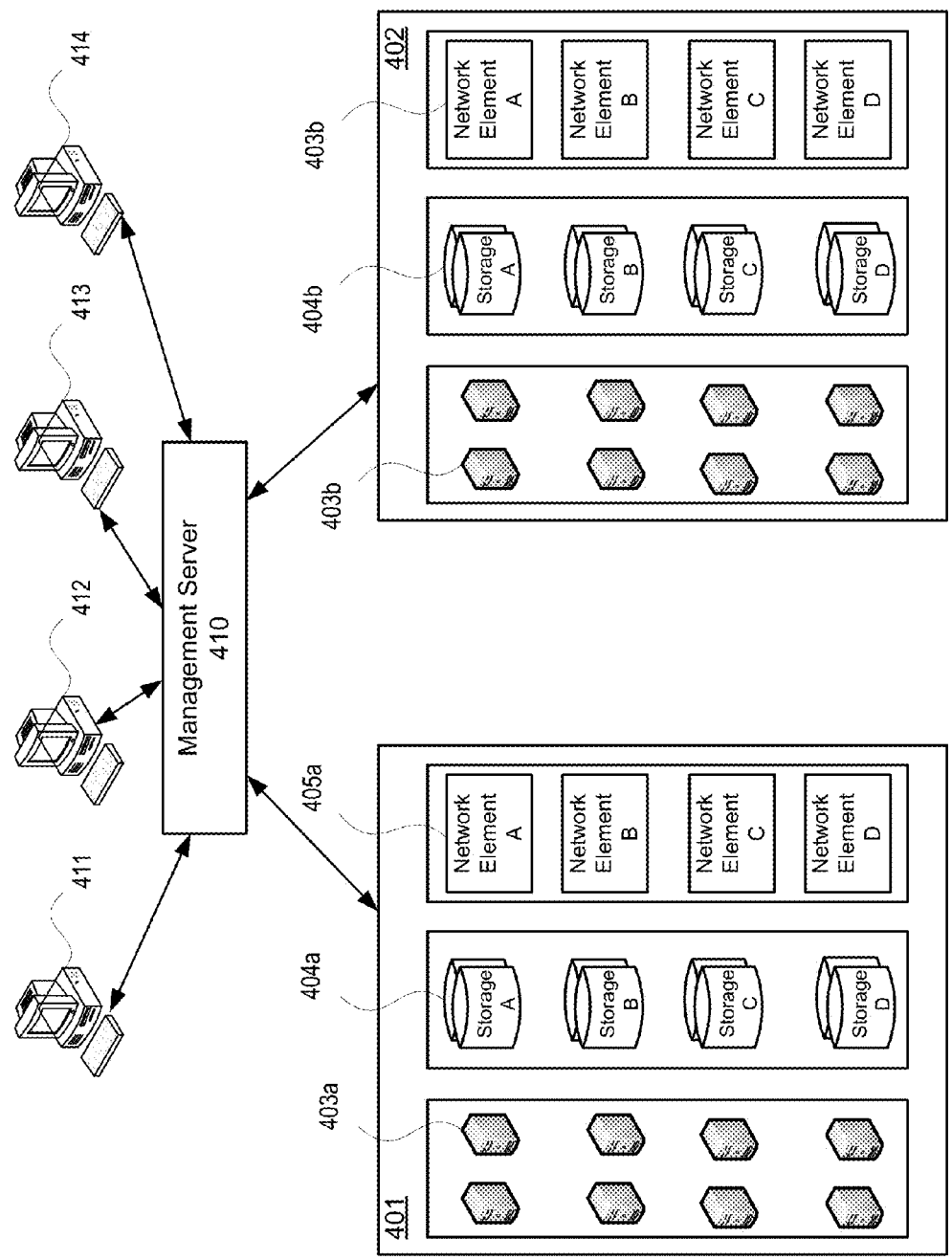
FIG. 4 depicts an illustrative cloud-based system architecture that may be used in accordance various aspects of the disclosure.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of APIs and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
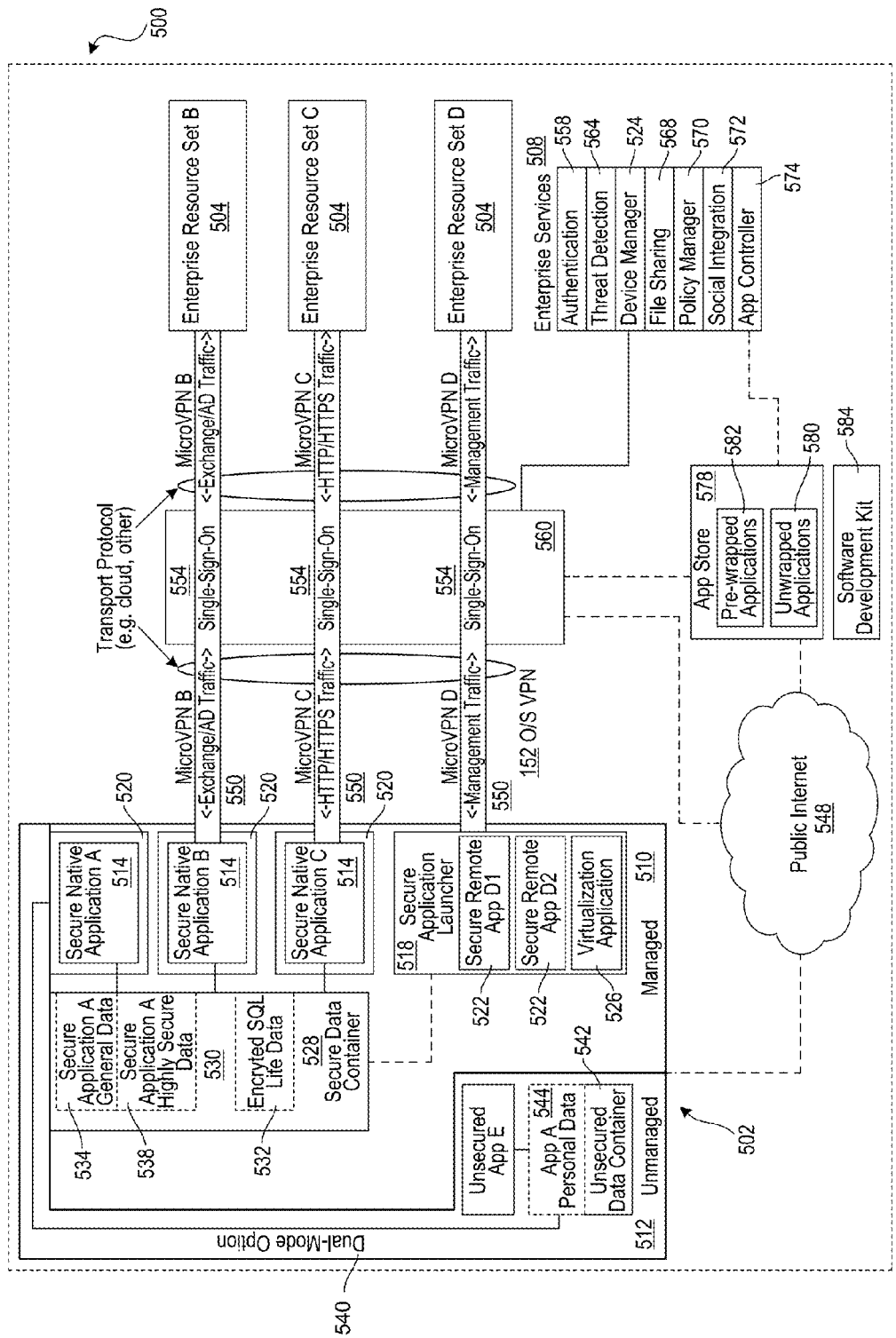
FIG. 5 depicts an illustrative enterprise mobility management system that may be used in accordance with one or more aspects of the disclosure.

FIG. 5 represents an enterprise mobility technical architecture 500 for use in a BYOD environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to user. The user may utilize the mobile device 502 for business use only or for business and personal use. The mobile device may run an iOS operating system, and Android operating system, or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as an enrolled device.

In some embodiments, the operating system of the mobile device may be separated into a managed partition 510 and an unmanaged partition 512. The managed partition 510 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a GUI and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUI's and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 528 in the managed partition 510 of the mobile device. The data secured in the secure data container may be accessed by the secure wrapped applications 514, applications executed by a secure application launcher 522, virtualization applications 526 executed by a secure application launcher 522, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as AES 128-bit encryption or the like, while highly secure data 538 may use a very strong form of encryption such as AES 256-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 504 and enterprise services 508 at an enterprise, to the public Internet 548, and the like. The mobile device may connect to enterprise resources 504 and enterprise services 508 through virtual private network connections. The virtual private network connections, also referred to as microVPN or application-specific VPN, may be specific to particular applications 550, particular devices, particular secured areas on the mobile device, and the like 552. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HTTP traffic, HTTPS traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use User Interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
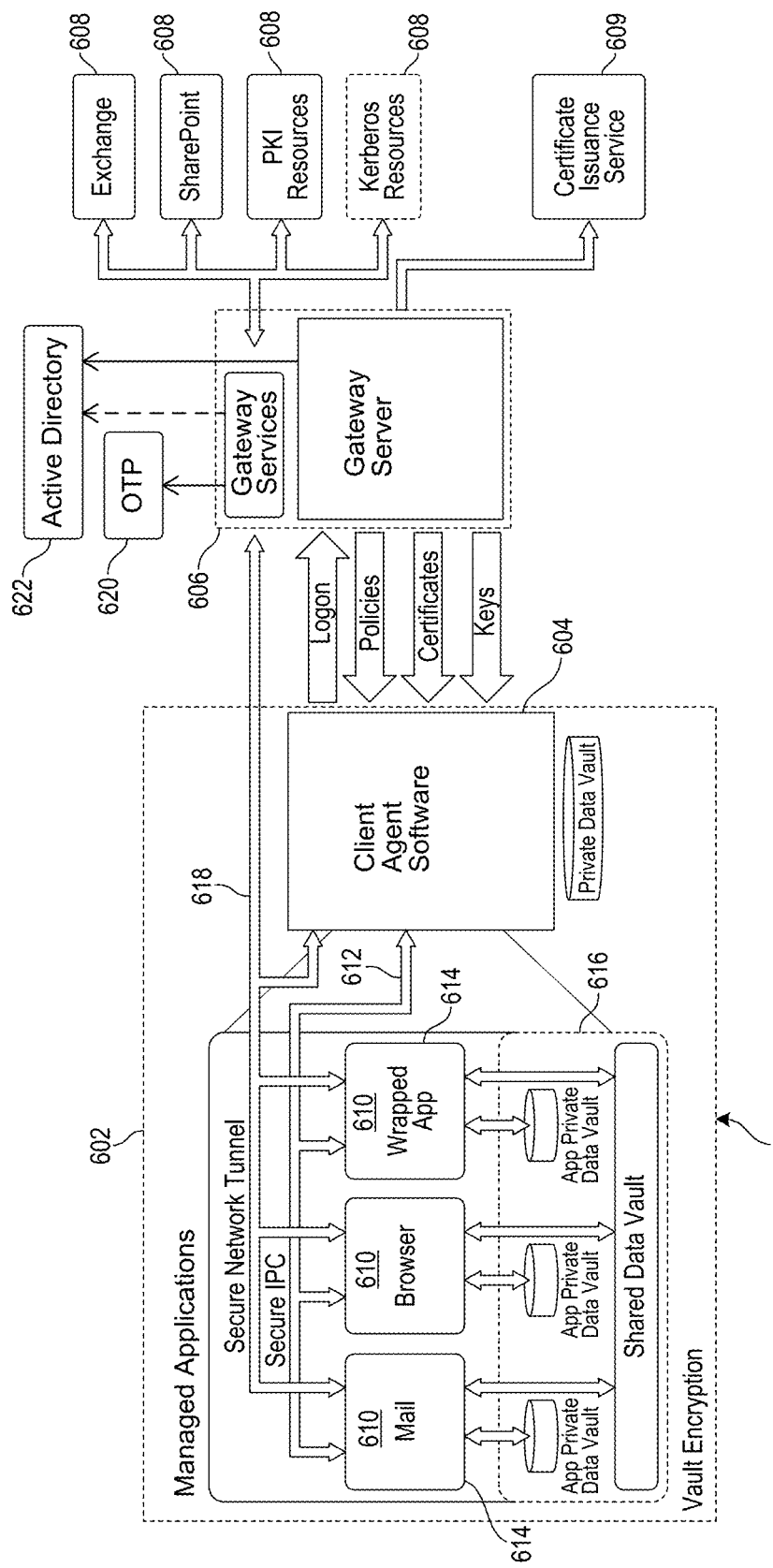
FIG. 6 depicts another illustrative enterprise mobility management system that may be used in accordance with various aspects of the disclosure.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes access gateway and application controller functionality) to access various enterprise resources 608 and services 609 such as Exchange, Sharepoint, PKI Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the HDX/ICA display remoting protocol. The client agent 604 also supports the installation and management of native applications on the mobile device 602, such as native iOS or Android applications. For example, the managed applications 610 (mail, browser, wrapped application, secure container to which a VPN, such as an application-specific policy-controller VPN can connect to) shown in the figure above are all native applications that execute locally on the device. Client agent 604 and application management framework of this architecture act to provide policy driven management capabilities and features such as connectivity and SSO (single sign on) to enterprise resources/services 608. The client agent 604 handles primary user authentication to the enterprise, normally to access gateway (AG) with SSO to other gateway server components. The client agent 604 obtains policies from gateway server 606 to control the behavior of the managed applications 610 on the mobile device 602.

The Secure IPC links 612 between the native applications 610 and client agent 604 represent a management channel, which allows client agent to supply policies to be enforced by the application management framework 614 "wrapping" each application. The IPC channel 612 also allows client agent 604 to supply credential and authentication information that enables connectivity and SSO to enterprise resources 608. Finally the IPC channel 612 allows the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 requests policy information from client agent 604, which in turn requests it from gateway server 606. The application management framework 614 requests authentication, and client agent 604 logs into the gateway services part of gateway server 606 (e.g., NetScaler access gateway). Client agent 604 may also call supporting services on gateway server 606, which may produce input material to derive encryption keys for the local data vaults 616, or provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel and obtain the policy for that application. The application management framework 614 may enforce relevant portions of the policy that apply locally, such as the client agent login dependencies and some of the containment policies that restrict how local OS services may be used, or how they may interact with the application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through access gateway 606. The application management framework 614 is responsible for orchestrating the network access on behalf of each application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 606 (including its gateway services) in some cases will not need to validate AD passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. When data is stored locally on the device 602 in the secure container 616, it is preferred that a minimum of AES 256 encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably PBKDF2) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want an enterprise application to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 604 may be retrieved by gateway server 606 and used in a keychain. Each managed application may have one associated client certificate, identified by a label that is defined in gateway server 606.

Gateway server 606 may interact with an Enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a PKCS 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of enterprise application store and an application controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

ILLUSTRATIVE EMBODIMENT(S)

Many mobile resource management (MRM) solutions (also referred to herein as enterprise mobility management (EMM), mobile device management (MDM) and mobile application management (MAM), each of which may include MRM) offer a virtual private network (VPN) solution as the mechanism for providing such access. However, traditional VPNs have the downside that all applications running on the mobile device are granted uniform access to the corporate intranet. Increasingly, mobile devices used to access enterprise resources are employee owned and not enrolled with an MDM server, and therefore not tightly controlled or managed by a corporate IT department. As such, there is a real risk of malware and other unauthorized software running on an employee's own mobile device to gain access to the corporate intranet when using traditional VPN software. Traditional system level VPN solutions do not discriminate between trusted and untrusted applications. By building in a per-application policy-controlled VPN solution, enterprises can ensure that only authorized applications for authorized users in specifically configured access scenarios are able to access corporate intranet resources from a foreign network.

Applications themselves can be developed and deployed quickly and updated frequently. As such, it is recognized that efficiencies can be gained by decoupling the policies from the underlying control point in such a way that the policy settings themselves as well as the administrative user interface (U/I) for configuring them need not be hardwired into the control point server software. Without this decoupling, the control point software would need to be upgraded every time a new application policy setting was needed.

An improved technique ensures that a wide range of policies, including application-specific policies and settings, can be composed, configured through an administrative interface, and delivered to the deployed applications, without requiring changes to control point software.

Enterprises may create (or adapt) their native mobile applications using tools and SDKs associated with the MRM solution they have chosen to deploy. Depending upon the tools or SDK version used to prepare such applications, one can expect that there will be a default set of policies that the MRM system provides automatically. These default policies can be further augmented by an application developer defining their own application specific policies and settings.

All policies and settings may be defined using a declarative syntax (metadata) that in some variations may include the various elements associated with each setting. In an example, the metadata is provided in the form of an XML (Extensible Markup Language) document that defines individual elements listed for each setting. For example, to define the beginning and end of a policy file, an XML document may use the tags <policymetadata> and </policymetadata>, respectively. The collection of policy setting may be between section tags <policies> and </policies>. Each policy setting may include elements such as the following:

a. Setting identifier, e.g., using special policy setting tags <policy> and </policy>, where the tags mentioned in the following elements are included between;
b. Setting group or category identifier, e.g., included between <policycategory> and </policycategory> tags;
c. Setting name, e.g., included between <policyname> and </policyname> tags;
d. Setting type (Boolean, integer, string, multistring, enum, uniform resource identifier (URI), etc), e.g., included between <policytype> and </policytype> tags;
e. Range of possible settings values (if needed dependent on setting type);
f. Default setting value, e.g., included between <policydefault> and </policydefault> tags;
g. Setting friendly name string (default language plus resource ID for localized name), e.g., included between <policystrings> and </policystrings> tags;
h. Setting units and other user interface (U/I) display strings (default language plus references to resource ID for localized strings), e.g., included between <policystrings> and </policystrings> tags;
i. Explanation and extended help text strings (default language plus references to resource ID for localized strings), e.g., included between <policystrings> and </policystrings> tags;

The various setting group or category identifiers that are available for each policy setting may defined using special <category> and </category> tags, and the collection of setting group or category identifiers may be included between <categories> and </categories> tags. The collection of setting group identifiers and the collection of settings may be included between the <policymetadata> and </policymetadata> tags. Accordingly, an XML document that defines a policy may take the general form similar to the following nested arrangement of XML tags with comments in [ ]:

```
<policymetadata>
    [tag to define version number of policy]
<versionnumber>1.1</versionnumber>
<categories>
    <category>
        [example definition for a setting group identifier provided below]
        <categoryid>Access_Auth</categoryid>
        <catlabel res_id="ACCESS_AUTH ">Authentication</catlabel>
    </category>
    [additional definitions for setting group identifiers]
</categories>
<policies>
    <policy>
        [example definition for a setting provided below]
        <policyname>ReauthenticationPeriod</policyname>
        <policytype>integer</policytype>
        <policycategory>Access_Auth</policycategory>
        <policydefault>480</policydefault>
        <policystrings>
            <title res_id="REATUH_PERIOD_TITLE">Reauthentication period
        (minutes)</title>
            <units res_id="REATUH_PERIOD_UNITS">minutes</units>
            <description res_id="REATUH_PERIOD_DESC">Defines the period
        before a user is challenged to authenticate again. If set to zero, the user is
        prompted for authentication each time app is started or activated. Default value is
        480 minutes (8 hours).</description>
        </policystrings>
    </policy>
    [additional definitions for settings]
</policies>
</policymetadata>
```

Figure 7:
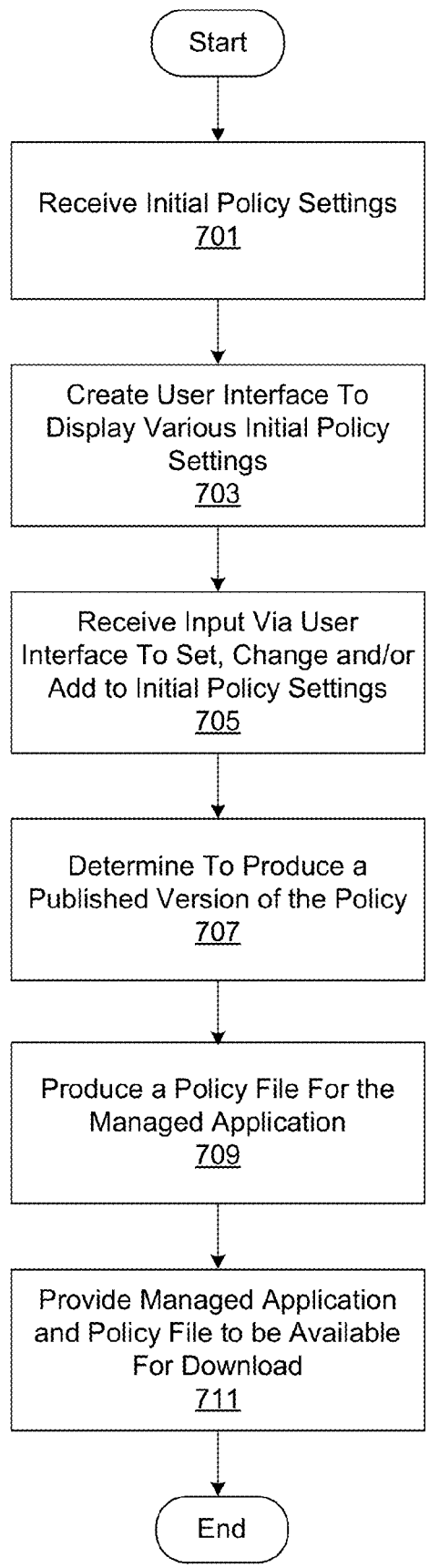
FIG. 7 illustrates an example method for configuring a policy for a managed application in accordance with one or more aspects of the disclosure.

FIG. 7 illustrates an example method for configuring a policy for a managed application. Additionally, FIG. 7 illustrates a method that is performed by the processing circuitry of one or more computing devices—such as an access gateway, another server under control by an IT administrator of an enterprise (or other user), or another device acting as a control point—when operating in accordance with various software constructs.

At step 701, the one or more computing device may receive initial policy settings or other data for inclusion in a policy. For example, application preparation tools may assemble one or more policies (also referred herein interchangeably as policy metadata, setting descriptions, and the like) including, for example, a set of default MRM system-provided policies, which may also include one or more application-specific policies or settings provided by the application developer. Such policies or settings may be packaged directly into the application bundle that will be uploaded to the computing device configured to perform the method of FIG. 7 (e.g., a control point, access gateway 560 of FIG. 5, or the like).

When a managed application is uploaded (e.g, for the purpose of publishing the application for enterprise users to consume), the one or more computing devices may proceed to finalize configuration of the policy for the managed application, as illustrated in steps 703-709 of FIG. 7.

At step 703, the one or more computing devices may create or otherwise display a user interface (UI) to display various portions of the initial policy settings. For example, upon uploading of the managed application, the one or more computing devices may read the initial policy settings or any other metadata associated with or packaged with the application and may dynamically compose an administrative user interface for all setting descriptions, policy metadata, etc. Further details related to the user interface will be discussed below in connection with FIGS. 12A-12J At step 705, the one or more computing device may receive input via the user interface to set, change, and/or add to one or more of the initial policy settings. For example, the IT administrator (or other user that, for example, has admin privileges) may interact with the various controls of the user interface to perform various actions to set or change a policy including, for example: choosing, modifying, entering, or creating settings that are appropriate for the managed application; or leaving preexisting settings set to the current or default value.

At step 707, the one or more computing devices may determine to produce one or more published versions of the policy. In some variations, the determination may be made responsive to input that is received via the user interface from the IT administrator (or other user). Such input may, for example, represent an acceptance of the policy for the managed application or a command to publish the policy.

Additionally, the user interface may be configured to allow the IT administrator (or other user) to create multiple policies from the policy settings. Each policy may, for example, be specific to a different user role associated with the enterprise (e.g., one policy for a sales employee; a different policy for a designer, etc.) or application group (e.g., a managed application may be assigned to an application group that provides various constraints or benefits to member applications, such as shared access to data stored in data containers, or the like).

At step 709, the one or more computing devices may produce one or more policy files for the managed application. For example, after the IT administrator (or other user) approves the policy for publishing/distribution to one or more mobile devices, a JSON (JavaScript Object Notation) or XML dictionary of key/value pairs representing each defined setting name (dictionary name) and its assigned value may be produced. In some environments, the settings of the policy file represent the corporate policy that should be enforced in order to access resources that are accessible via the access gateway or to execute the managed application.

As discussed above, the user interface may be configured to allow the IT administrator (or other user) to create multiple policies from the policy settings. Accordingly, multiple policies may be produced with each policy being specific to a different user role associated with the enterprise (e.g., one policy for a sales employee; a different policy for a designer, etc.) or application group (e.g., a managed application may be assigned to an application group that provides various constraints or benefits to member applications, such as shared access to data stored in data containers, or the like).

At step 711, the one or more computing devices may provide the managed application and the policy file available to be available for download by one or more mobile devices. For example, once uploaded and configured, the managed applications and any associated policy can be made available to an enterprise's employees to peruse and choose to install. In some instances the version of the application and the policy that is made available to each user can be based on their role within the organization. Alternatively, such applications and policies can be pushed directly to mobile devices for users who have enrolled or registered their device with a corporate MDM server that provides such a push service.

Further, in some instances, distribution of the policy may be separate from distribution of the managed application. For example, when an employee executes a managed application on the mobile device, they may be challenged to authenticate their corporate identity along with passwords and other factors as dictated by corporate policy. After having authenticated the user and/or device, the access manager components of the system may verify that the user is entitled to the application in question and download the JSON or XML policy file that represent the settings that have been established by the administrator for this user or mobile device when using this specific managed application.

Transmission of the policy and managed application to the mobile device may, in some variations, be performed using one or more application specific VPN tunnels, such as a MicroVPN (discussed above).

After distribution to the user's devices and to enforce the various settings in the policy, the policy file can be consulted by the application or MRM software embedded within the mobile device (e.g., by the client agent 604 of FIG. 6) whenever a policy decision is needed at run time. In some embodiments, the policy may be cached and periodically refreshed to ensure continued compliance with configured administrative settings produce a policy file for the managed application (e.g., an IT administrator may update a policy by performing a method similar to that illustrated in FIG. 7 to change, delete, or add to the policy). Indeed, in some variations, one of the policy settings may dictate a required update frequency to the policy. Alternatively, the MRM system may be configured to check if an updated version of the policy exists when, for example, the access gateway receives an indication that the managed application is executing on the mobile device (e.g., the access gateway receives a request to authenticate the user, mobile device or application; the access gateway receives a request to create an application specific VPN tunnel, the access gateway receives a request to access a resource that is accessible through the access gateway, or the like). If an update exists, the MRM system may transmit the updated version of the policy to the mobile device.

In some variations, transmission of an update to the policy may be performed without updating the managed application. Further, the user of the mobile device may be unaware of the update to the policy.

As new versions of the EMM toolkit or SDK become available and as new applications are developed and adapted to this system, the available set of policies needed by a current application mix that is installed on a mobile device can grow dramatically. However, no change in control point software is needed to offer administrative control over the new settings surfaced by these newly deployed applications.

To configure one or more policies, the settings included in a policy or other metadata, an enterprise may provide a user interface that is usable by an operator to view, create, and edit the policies, applications, and other data related to the same. FIG. 12A-12J illustrate example user interfaces that can be used to configure one or more policies, settings or metadata. In some embodiments, the user interface may be executed by one or more computing devices, such as an access gateway another server under control by an IT administrator of an enterprise, or another device acting as a control point. In particular, the user interface of FIGS. 12A-12J may be usable by an operator or other user with administrator privileges. Accordingly, the operator may be required to log in prior to viewing the user interface displayed in FIGS. 12A-12J. FIGS. 12A-12J as illustrated with an "administrator" being logged in, as indicated at display 1205 of FIG. 12A. While additional details for configuring a policy will be described throughout this disclosure (e.g., in connection with FIG. 7), the example user interfaces will be described, for example, to illustrate various settings that may comprise a policy and other data that an operator may view when an enterprise provides managed applications and policies to mobile devices.

Figure 12A:
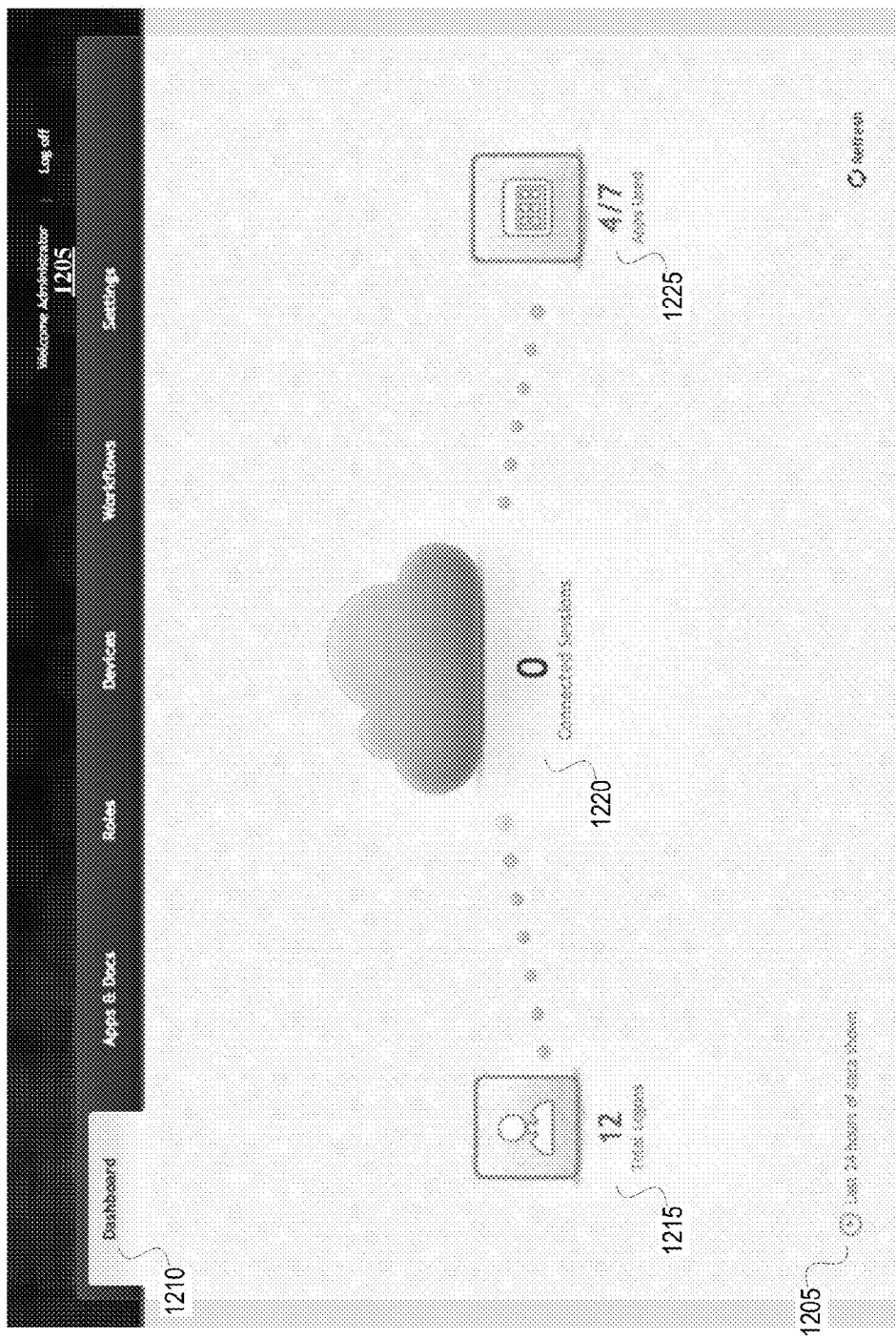
FIGS. 12A-12J illustrate example user interfaces that can be used to configure one or more policies in accordance with various aspects described herein.

As illustrated in FIG. 12A, an example dashboard interface 1210 is shown. The dashboard 1210 may provide a quick snapshot of user activity over a specified period of time (e.g., the last 24 hours of user activity, as shown at 1205). In the illustrated embodiment, the dashboard 1210 displays the total number of users that have logged in via display 1215; the number of applications or resources that have been accessed by those total number of users via display 1225; and the current number of connected user sessions via display 1220.

Figure 12B:
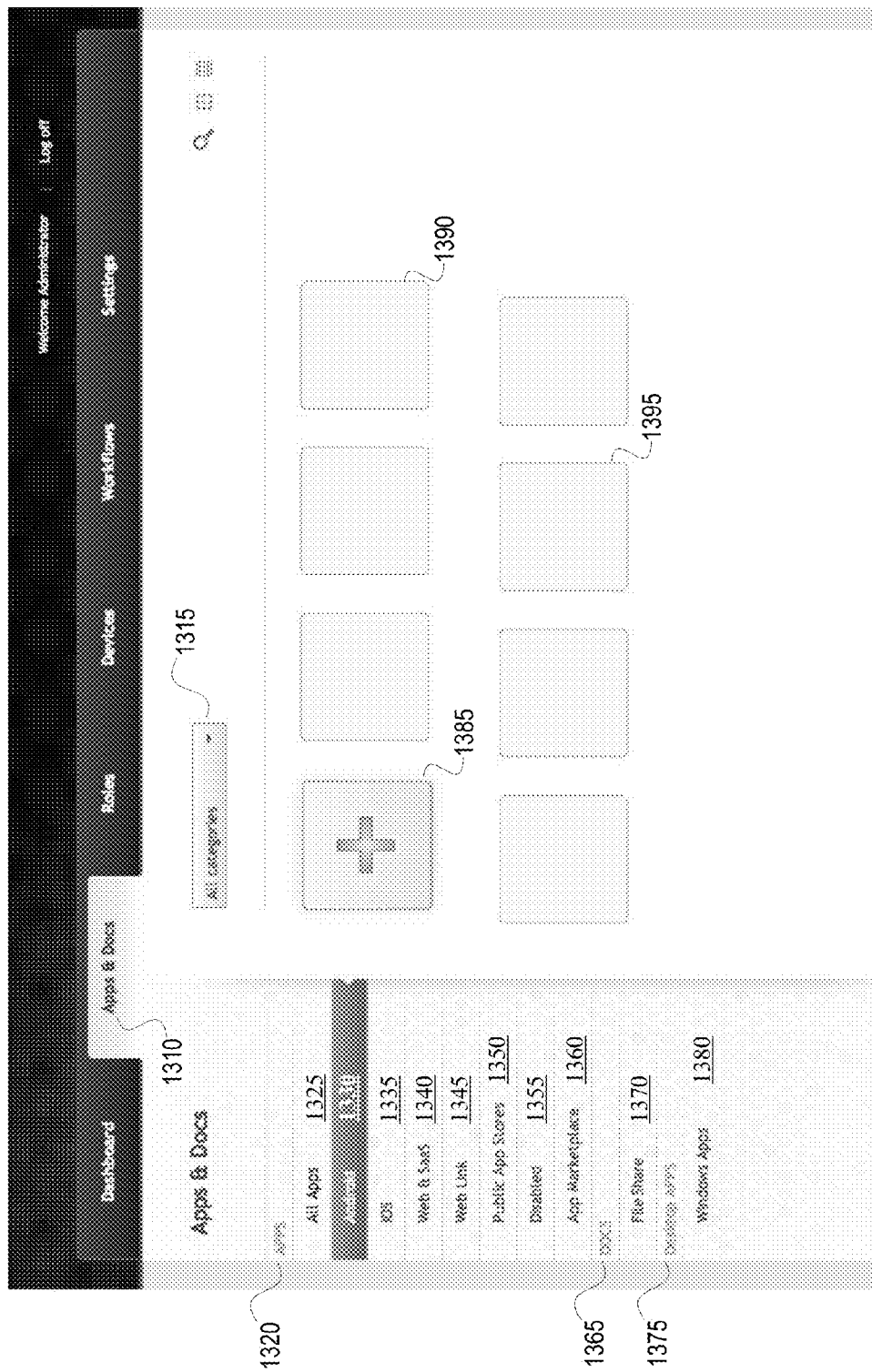

FIGS. 12B-12J illustrate different views of the user interface that provide options for viewing and editing the policies for the applications and resources. The example embodiment organizes the options under "Apps & Docs" tab 1310. The policies may be for resources of various types and the user interface may be organized based on the various types. For example, as illustrated, the user interface of FIG. 12B is organized into a mobile application type 1320, a document type 1365, and a desktop application type 1375. These general resource types may be further divided into sub-type such as by operating system (e.g., mobile application type 1320 is illustrated as being sub-divided into applications for the Android operating system 1330 and iOS operating system 1335; and desktop application type 1375 is illustrated as being sub-divided into applications for the Windows operating system 1380); whether the resource provides a web-based service or a software as a service (SAAS) model (e.g., a type for web service and SaaS model applications 1340); whether the resource functions as a simple link to a website (e.g., a type for a web link application 1345); whether the resource is an application store or marketplace (e.g., a type for public application stores/marketplaces 1350 and a type for enterprise application stores/marketplaces 1360); whether the resource is being provided by a cloud service (e.g., a type for providing documents via a file share service 1370); and whether the resource has been disabled from being available to users (e.g., a type for disabled applications 1355). In some embodiments, these types may not be specified in any policy file or metadata. Indeed, these types may be solely for the benefit of the administrator in navigating the user interface to find the resource policy file in which he or she intends to create/edit. However, in others, the type and sub-type may be specified in a policy file. For example, when the policy is first created, the administrator may specify the type and version number, which can be viewed after policy creation but not editable (e.g., settings 1520 and 1525 of FIG. 12D).

After choosing one of the resource types or sub-types, the administrator may be presented with a listing of policies associated with that resource type. As further illustrated in FIG. 12B, the sub-type Android 1330 for the application type 1325 has been selected, and a number of icons are shown as being presented. Included in the icons is an icon for each policy that has been created (e.g., icon 1390 and icon 1395). While FIG. 12B illustrates these icons as being blank, they may include graphics and/or text within the icon's border or surrounding the icon. Also included in the icons is an icon for creating a new policy 1385. While the remaining portion of FIGS. 12C-12J will be described in connection with configuring a policy for a mobile application of the Android operating system, different policy settings and displays may be used for the different resource types.

Figure 12C:
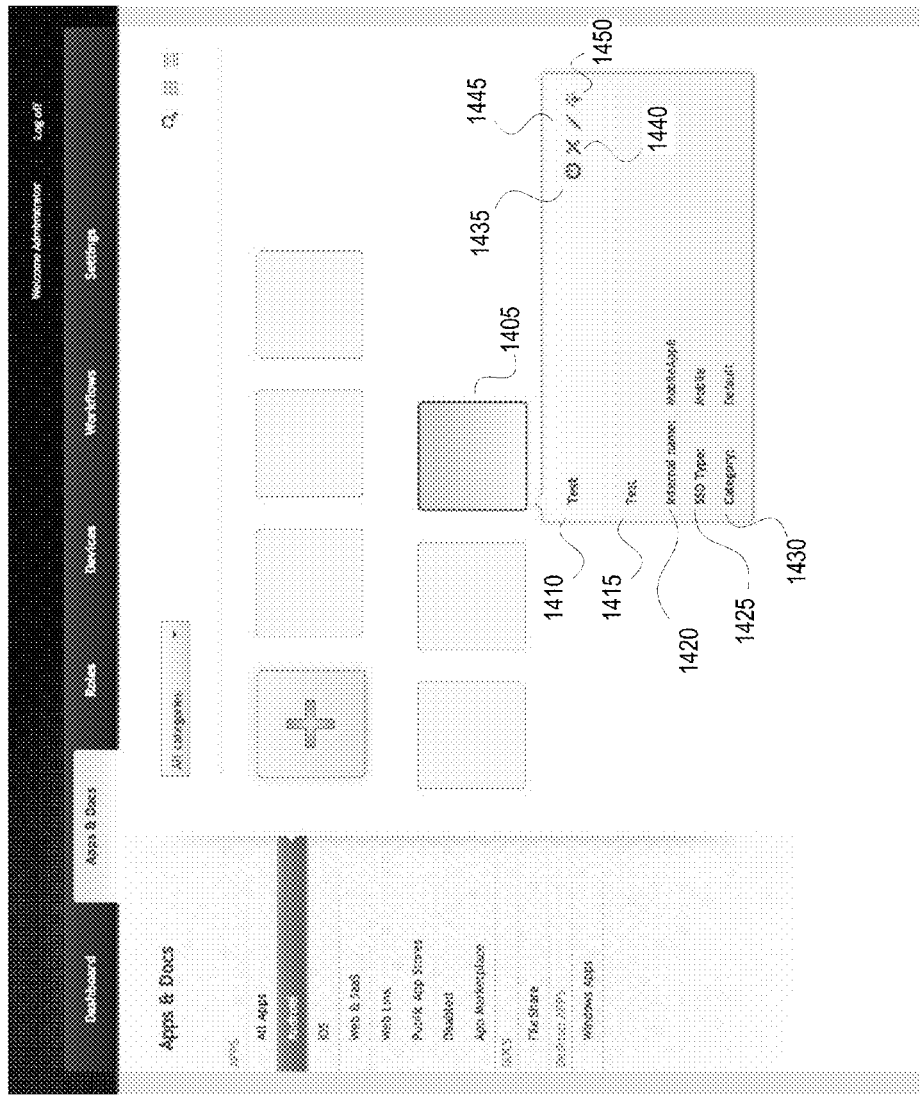

As will be described in connection with FIG. 12C, each policy may also be given a category setting. The administrator may be able to filter the displayed icons by pull-down selector 1315, which lists the various categories of the policies.

When an administrator selects an icon (e.g., via a "single-click"), a summary window may appear that provides a few details from the policy file/metadata and a few additional selectable options. For example, when icon 1405 of FIG. 12C is selected, the details may include a display name 1410 for the policy (which is editable at 1510 of FIG. 12D), a description 1415 for the policy (which is editable at 1515 of FIG. 12D), an internal or workflow name 1420 for the policy (which is editable at 1610 of FIG. 12E), a single sign on (SSO) type 1425 for the policy; and a category 1430 for the policy (which is editable at 1545 of FIG. 12D). The additional selectable options may include an option 1435 to disable/enable the policy; an option 1440 to delete the policy; an option 1445 to edit the policy; and an option 1450 to push the policy to users' devices.

If the administrator selects to edit the policy via option 1445, a mobile application details screen 1505 may be displayed in the user interface. The details screen 1505 may present an opportunity for the administrator to view and edit various settings of the policy.

When it is initially viewed, the mobile application details screen 1505 may first present the settings associated with the details group for the policy (e.g., setting group identifier 1502 for details settings). For example, the resource name that the policy is for may be defined (e.g., mobile application name setting 1510) and a short description of the resource may also be defined (e.g., description 1515). The resource type and resource version may both be viewable (e.g., mobile application type 1520 and mobile application version 1525), and may have been defined when the policy was first created.

When the policy is first created, the resource/application that the policy is to be applied to may be analyzed to determine the default settings for the policy. For example, an application can be analyzed to determine the application programming interface (API) calls that it performs and various settings can be included in the policy based on those API calls. As a particular example, if the application makes a call to the mobile device's camera, various settings to block/allow access to the camera may be included in the policy. If no calls are made to the mobile device's camera, setting(s) to block/allow access to the camera may not be included in the policy.

Figure 12D:

The policy may also define various version constraints on the resource. For example, FIG. 12D illustrates a policy setting for enforcing a minimum and maximum operating system version for a mobile application at minimum OS version 1530 and maximum OS version 1535. The policy may also exclude one or more devices from being able to access/install the resource (e.g., excluded devices setting 1540). A category for the policy may be defined (e.g., category setting 1545 and one of the types enumerated by pull-down selector 1315). The policy may include a user role setting to enforce a role a user must be assigned in order to access/install the resource (e.g., assigned role setting 1550). The policy may also include a setting to enforce a requirement that the resource be installed on the mobile device (e.g., require application installation setting 1555). After viewing/editing the various policy settings on the mobile application details screen 1505, the administrator may press the next button 1560 to save the settings of mobile application details screen 1505 to the policy file.

Figure 12E:
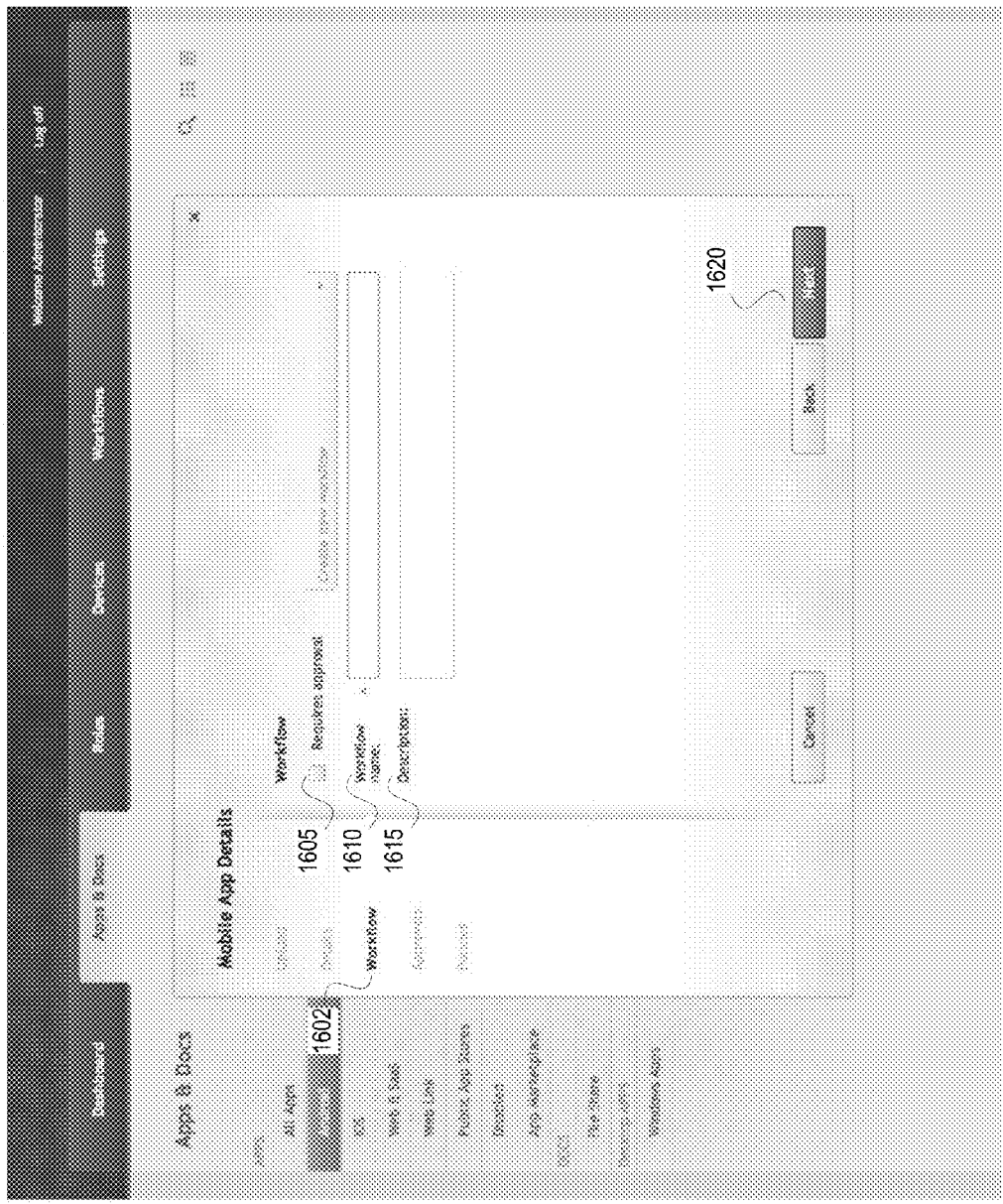

After pressing next button 1505, the user interface may display the settings associated with the workflow group for the policy (e.g., setting group 1602 for workflow settings), which is illustrated in FIG. 12E. The settings that can be viewed/edited at mobile application workflow screen 1602 include a setting that distribution of the policy to a user's device requires approval (e.g., approval setting 1605), a setting specifying a workflow name for the policy (e.g., workflow name 1610), and a description of the workflow (e.g., description setting 1615). After viewing/editing the mobile application workflow settings, the administrator may press next button 1620 to save the workflow settings of the mobile application details screen 1505 to the policy file.

Figure 12F:
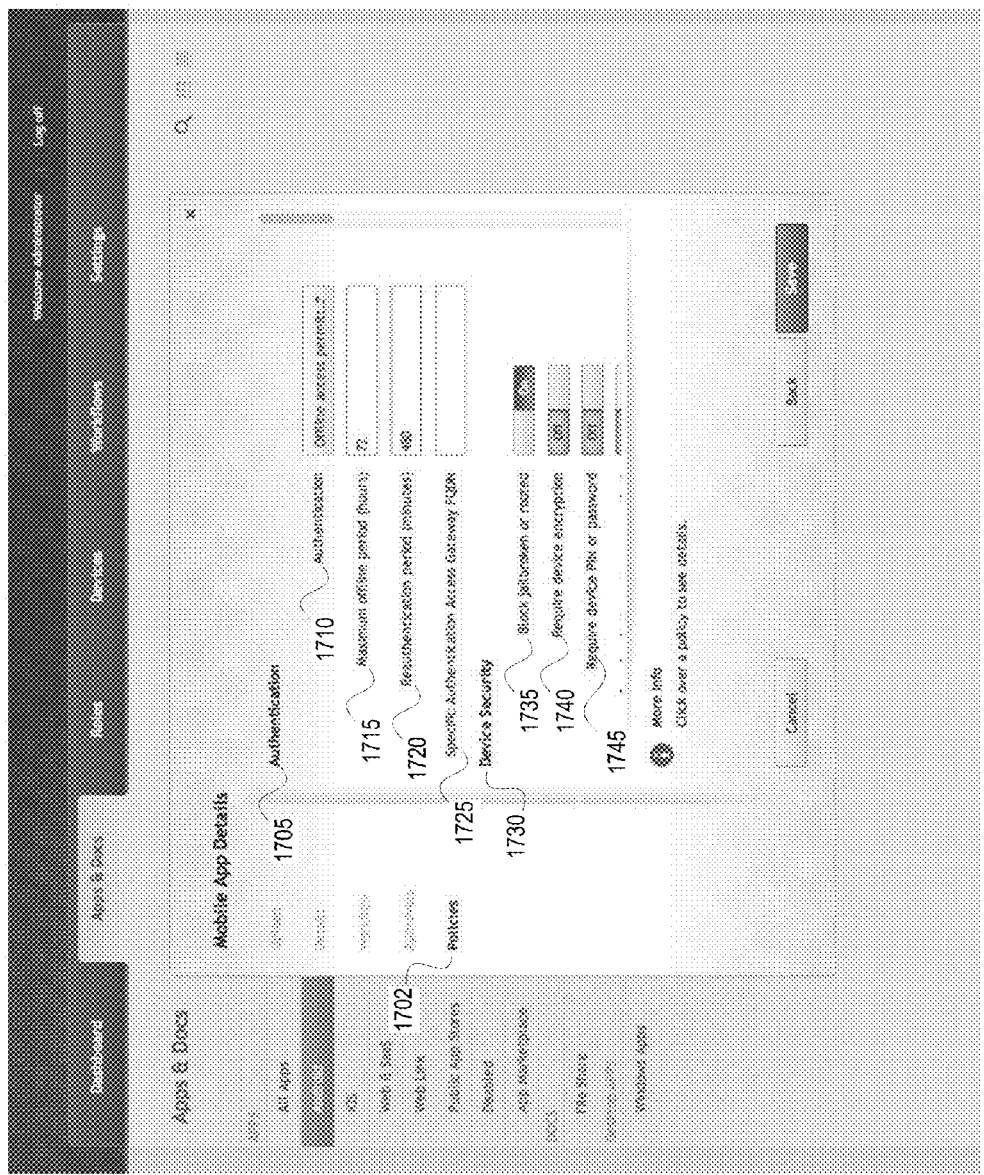
Figure 12G:
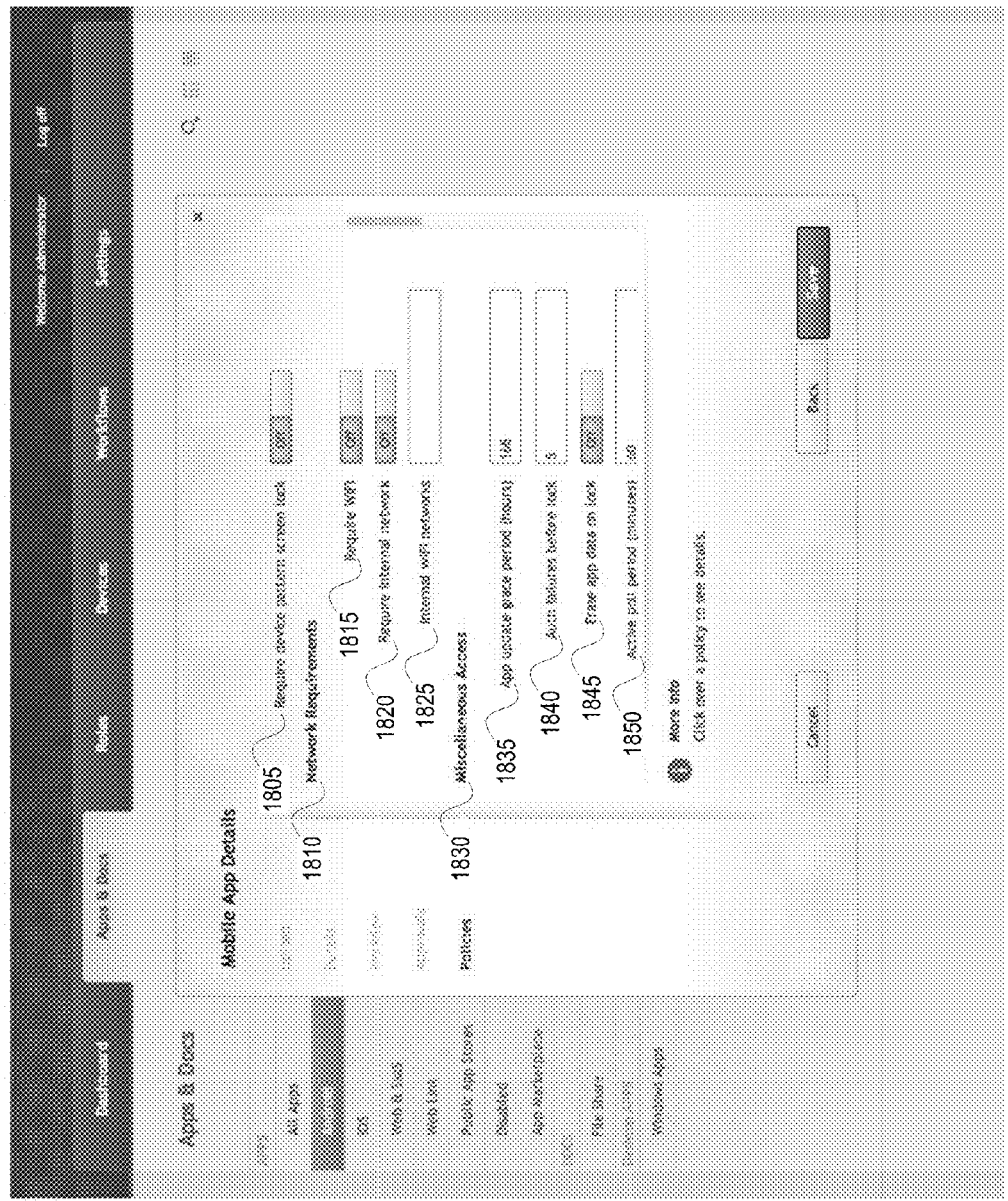
Figure 12H:
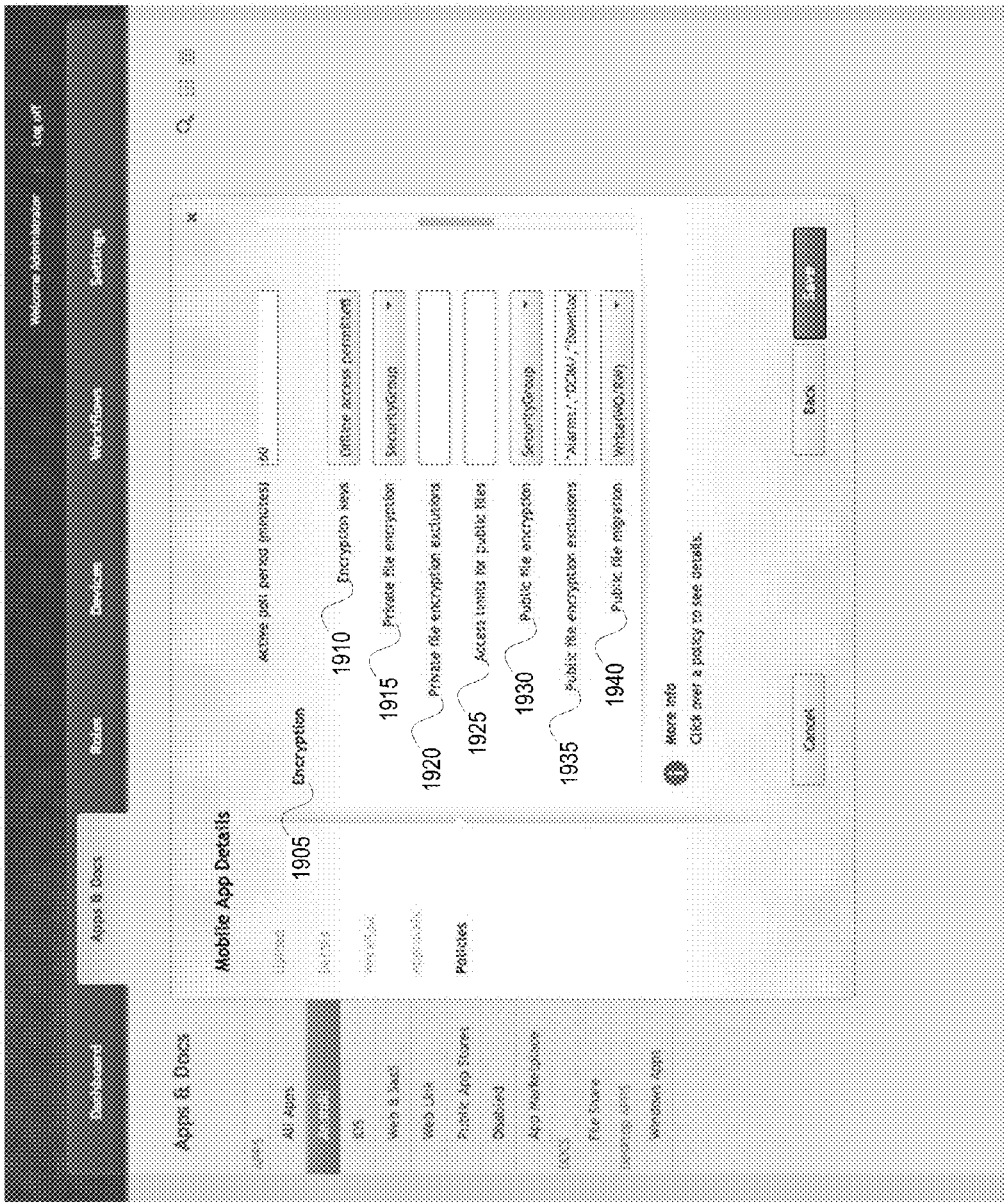
Figure 12I:
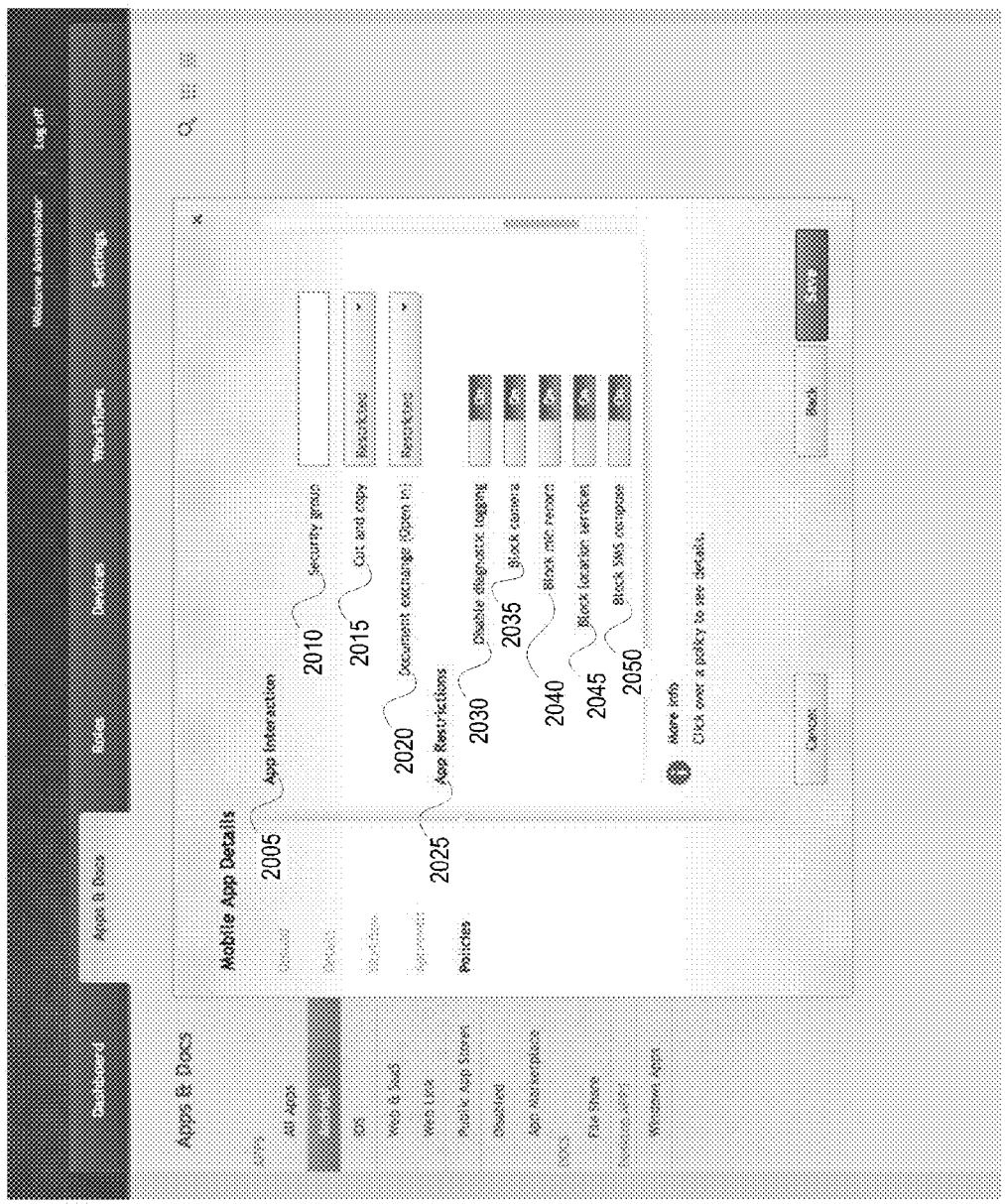
Figure 12J:
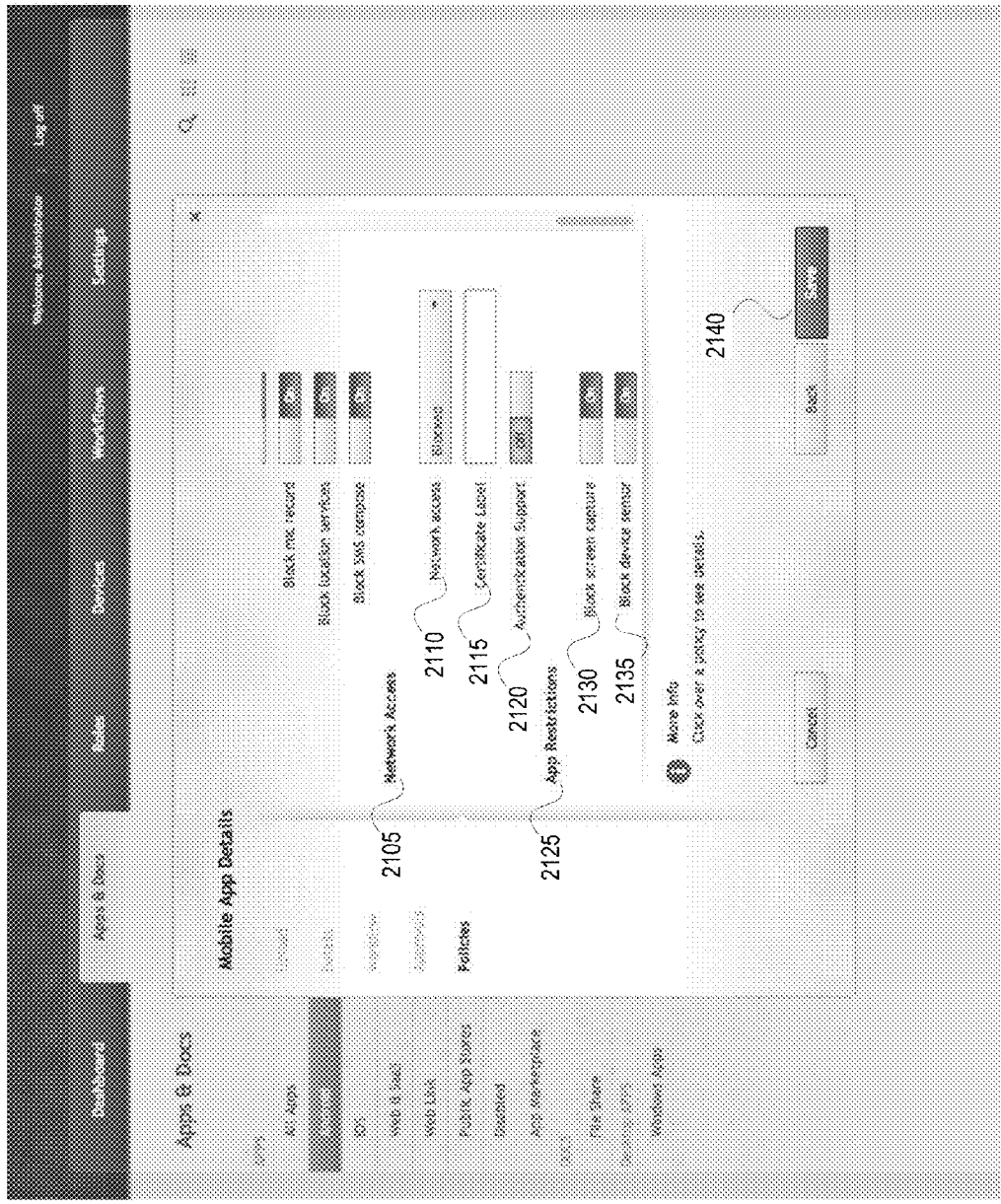

After pressing next button 1620, the user interface may display the remaining policy settings (e.g., policy settings 1702), which are illustrated in FIGS. 12F-12J. Policy settings 1702 may include the remaining setting groups that are enumerated in the policy including, for example, a setting group for authentication settings (setting group 1705 for authentication settings, as illustrated in FIG. 12F); a setting group for device security settings (setting group 1730 for device security settings, as illustrated in FIGS. 12F and 12G); a setting group for network requirement settings (setting group 1810 for network requirement settings, as illustrated in FIG. 12G); a setting group for miscellaneous access settings (setting group 1830 for miscellaneous network access settings, as illustrated in FIG. 12G); a setting group for encryption settings (setting group 1905 for encryption settings, as illustrated in FIG. 12H); a setting group for application interaction settings (setting group 2005 for mobile application interaction settings, as illustrated in FIG. 12I); a setting group for application restriction settings (setting groups 2025 and 2125 for application restriction settings, as illustrated in FIGS. 12I and 12J); and a group for network access settings (setting group 2105 for network access settings, as illustrated in FIG. 12J).

As illustrated in FIG. 12F, a policy file may include various settings defined as part of an authentication settings group identifier (e.g., those illustrated in FIG. 12F as being part of setting group 1705).

Authentication group settings may include authentication setting 1710, which may define what level of authentication is required, such as whether a networked log-on with the access gateway is required before accessing the application, whether offline access of the application is permitted, whether access of the application can only be performed when offline, or whether authentication is not required to access the application.

The policy may also specify a maximum offline period setting 1715, which specifies a time period that, when exceeded by the mobile device, would cause the mobile device to challenge the user for the enterprise logon before allowing access to the application. As illustrated, maximum offline period setting 1715 is set for 72 hours. In some embodiments, the minimum amount is 1 hour. Additionally, in some arrangements where authentication setting 1710 is set to requiring a networked-log on, the user will be reminded that a networked log-on will be required at various times before the period expires (e.g., 30 minutes, 10 minutes, etc.), and, after expiration, the application remains locked until the user completes a successful network log-on. Alternatively, if the authentication setting 1710 is set to requiring a networked log-on, setting 1715 may be ignored with no offline access allowed.

The policy may also specify a re-authentication period setting 1720, which defines a period where when it is expired and the application is re-started, a user is challenged to re-authenticate. In some arrangements, if set to zero, the user is prompted for authentication each time app is started or activated. As illustrated, re-authentication period setting 1720 is set for 480 minutes (e.g., 8 hours). Accordingly, when the application is re-started after 8 hours from a previous authentication, the user will be required to re-authenticate (e.g., supply the log-on username and password).

The policy may also specify a domain name of the access gateway that the mobile device is to use when authenticating. As illustrated, gateway domain name setting 1725 allows an administrator to specify a fully qualified domain name (FQDN) of an access gateway that will handle authentication.

As illustrated in FIGS. 12F and 12G, a policy file may include various settings defined as part of a device security settings group identifier (e.g., those illustrated in FIGS. 12F and 12G as being part of setting group 1730).

Device security settings group 1730 may include a setting specifying whether to block jailbroken or rooted devices. For example, block jailbroken setting 1735, if set to "on" the application is locked when the device is jailbroken or rooted. If setting 1735 is set to "off" the application can run even if the device is jailbroken or rooted.

The policy may also include a require device encryption setting 1740. If require device encryption setting 1740 is set to "on" data stored on the mobile device will be encrypted (e.g., in accordance with the encryption settings group, as discussed below). If require device encryption setting 1740 is set to "off" the data stored on the mobile device is not encrypted.

The policy may also include a require device PIN (personal identification number) or password setting 1745. If setting 1745 is set to "on" the user will be required to lock/unlock the mobile device using a PIN or password. If set to "off" the mobile phone will not be required to be locked via a PIN or password.

The policy may also include a require device pattern screen lock setting 1805. If setting 1805 is set to "on" the user will be required to lock/unlock the mobile device using a pattern screen lock mechanism. If set to "off" the mobile phone will not be required to be locked via a pattern screen lock mechanism.

As illustrated in FIG. 12G, a policy file may include various settings defined as part of a network requirements settings group identifier (e.g., those illustrated in FIG. 12G as being part of setting group 1810).

Network requirements setting group 1810 may include a require WiFi setting 1815. If setting 1815 is set to "on" the application will be locked when the device is not connected to a WiFi network (e.g., 3G, 4G, LAN connection, etc.). If setting 1815 is set to "of" the application will be able to run even if the mobile device does not have an active WiFi connection.

The policy may also include a require internal network setting 1820. If setting 1820 is set to "on" the application is allowed to run on the mobile device only when the mobile device is connected inside the enterprise network. If setting 1820 is set to "off" the application can run from an external network.

The policy may also include an internal WiFi network setting 1825. Setting 1825 may be defined by a comma separated list of allowed internal WiFi network identifiers (e.g., SSID). In some arrangements, this setting applies only when connected via an internal enterprise network. For example, when the mobile device is connected from inside the enterprise network, application access is blocked unless the device is connected via one of the listed network identifiers. If setting 1825 is empty, any internal WiFi network may be used. If logged on from an external network (or not logged on), this setting may not enforced.

As illustrated in FIG. 12G, a policy file may include various settings defined as part of a miscellaneous access settings group identifier (e.g., those illustrated in FIG. 12G as being part of setting group 1830).

Miscellaneous access setting group 1830 may include an update grace period setting 1835. Setting 1835 may define the grace period within which the application may continue to be used after the system has discovered that an update is available.

The policy may also include an authentication failure setting 1840. Setting 1840 may define a number of consecutive failed offline password challenges that will cause the application to become locked. Once locked, the application may only be unlocked through a successful network log-on. In some arrangements, if setting 1840 is set to zero, authentication failures will never cause the application to become locked.

The policy may also include an erase application data setting 1845. Setting 1845 may define whether application data should be deleted when the application is locked. If setting 1845 is set to "on" data maintained by the application may be erased when the application is locked. Erasing such data may effectively reset the application to its original installed state. If setting 1845 is set to "off" data maintained by the application is not erased when the app is locked. An application can be locked for various reasons such as, for example: loss of application entitlement for the user; application subscription removed; user account removed by the enterprise, too many application authentication failures, the mobile device being jailbroken or rooted without policy permitting application access when the device is jailbroken/rooted, device placed in lock state by administrative action, and the like.

The policy may also include an active poll period setting 1850. Setting 1850 defines a poll period for reaching the application controller and providing the application controller with information about the lock/erase status of the mobile device and the enable/disable status of the application. After a successful poll, the interval may be restarted and a new poll will again be attempted upon expiration of the specified poll period.

As illustrated in FIG. 12H, a policy file may include various settings defined as part of an encryption settings group identifier (e.g., those illustrated in FIG. 12H as being part of setting group 1905).

Encryption settings group 1905 may include an encryption keys setting 1910 to allow how encryption keys are managed. For example, if setting 1910 is set to "online access only" data used to derive encryption keys cannot be persist on the device (e.g., be stored in a long-term storage). Instead, such data must be recovered from the enterprise each time the encryption keys are to be derived. If setting 1910 is set to "offline access permitted" data used to derive encryption keys can persist on the device. In some arrangements, if setting 1910 is set to "online access only" authentication setting 1710 is enforced to be set to "network logon."

The policy may also include a private file encryption setting 1915 that specifies a security group which can access the application's private files. This allows for different applications assigned to the specified security group to derive the keys used to encrypt/decrypt the private files.

The policy may also include a private file encryption setting 1920 that specifies exclusions to databases/specific locations where private files/data will not be automatically encrypted.

The policy may also include an access limit setting 1925 that specifies access limits for public files.

The policy may also include a public file encryption setting 1930 that specifies a security group which can access the application's public files. This allows for different applications assigned to the specified security group to derive the keys used to encrypt/decrypt the public files.

The policy may also include a public file encryption setting 1935 that specifies exclusions to databases/specific locations where public files/data will not be automatically encrypted.

The policy may also include a public file migration setting 1940 that specifies the access permissions that public files are assigned.

As illustrated in FIG. 12I, a policy file may include various settings defined as part of an application interaction settings group identifier (e.g., those illustrated in FIG. 12I as being part of setting group 2005).

Application interaction setting group 2005 may include a security group setting 2010 that specifies a security group for the policy. In some arrangements, when this setting is set to blank, all applications can exchange data with the application. In some embodiments, when this application is given one or more comma separated security group identifiers, only security groups matching one of the listed identifiers will be able to exchange data with the application.

The policy may also include a cut and copy setting 2015 that, for example, specifies whether the application is able to perform cut and copy operations (e.g., blocked or unrestricted), or whether the application is only able to cut and copy operations with applications in its security group (e.g., restricted). When setting 2015 is set to "restricted" cut or copied data is placed in a private clipboard that is only available to applications having the same security group as the application. A similar setting could be included in a policy related to paste operations.

The policy may also include a document exchange setting 2020. Setting 2020, in some variations, blocks, permits, or restricts document exchange operations for this application (e.g., by being set to blocked, unrestricted or restricted). When setting 2020 is set to "restricted" data can be exchanged only with other applications having the same security group as the application.

As illustrated in FIGS. 12I and 12J, a policy file may include various settings defined as part of an application restriction settings group identifier (e.g., those illustrated in FIGS. 12I and 12J as being part of setting group 2025 and setting group 2125).

Application restriction settings group 2125 may include a disable diagnostic logging setting 2030. If setting 2030 is set to "on" the application is unable to interact with the mobile device's diagnostic logging operations. If set to "off" the diagnostic logging operations are allowed to be performed for the application.

The policy may also include a block camera setting 2035. If setting 2035 is set to "on" the application may be unable to access the mobile device's camera. If set to "off" the application may be able to access the mobile device's camera.

The policy may also include a block microphone record setting 2040. If setting 2040 is set to "on" the application may be unable to record data via the mobile device's microphone. If set to "off" the application may be able to access/record from the mobile device's microphone.

The policy may also include a block location services setting 2045. If setting 2045 is set to "on" the application may be unable to access the mobile device's location services (e.g., global positioning services (GPS)). If set to "off" the application may be able to access the mobile device's location services.

The policy may also include a block short messaging service (SMS) setting 2050. If setting 2050 is set to "on" the application may be unable to access the mobile device's SMS compose function. If set to "off" the application may be able to access the mobile device's SMS compose function.

The policy may also include a block screen capture setting 2130. If setting 2130 is set to "on" the application may be unable to access the mobile device's screen capture function. If set to "off" the application may be able to access the mobile device's screen capture function.

The policy may also include a block device sensor setting 2135. If setting 2135 is set to "on" the application may be unable to access the mobile device's sensors (e.g., acceleration, orientation sensors, and the like). If set to "off" the application may be able to access the mobile device's sensors.

As illustrated in FIG. 12J, a policy file may include various settings defined as part of a network access settings group identifier (e.g., those illustrated in FIG. 12J as being part of setting group 2105).

Network access settings group 2105 may include a network access setting 2110. Setting 2110 can have various values related to preventing, permitting or redirecting network activity that is attempted by/intended for the application. For example, if setting 2110 is set to "unrestricted" no restrictions are placed on the network access of the application. If setting 2110 is set to "blocked" all network access is blocked. If setting 2110 is set to "tunneled to the internal network" an application-specific VPN tunnel back to the access gateway may be required for all network access.

The policy may include a certificate label setting 2115 that allows for a particular certificate to be used for network access.

The policy may include an authentication support setting 2120 that specifies whether a user should be authenticated before allowing network access.

After viewing/editing the various policy settings, the administrator may press save button 2140 to save the policy settings to the policy file.

The above settings are meant to only be examples of the types of settings that could be included in a policy. Variations on the above settings or different settings not discussed above could be included in a policy.

For example, additional types of policy settings not shown in FIGS. 12A-12J include, for example, a disable e-mail setting that blocks/allows access to the mobile device's e-mail functions; a disable paste setting that blocks/allows paste operations; a disable print setting that blocks/allows access to the mobile device's print functions; a disable cloud setting that blocks/allows access to the mobile device's cloud services; and one or more network traffic filters.

One example of a traffic filter is an outbound traffic filter. Some applications, such as iOS applications, can dispatch uniform resource locator (URL) requests to other applications that have been registered to handle specific schemes (such as "http://"). Such an outbound traffic filter setting may provide a mechanism for an application to pass requests for help to another application. This setting serves to filter the URLs that are passed from this application to other applications. In some arrangements, the value of the setting should be formatted as a comma separated list of patterns where each pattern may be preceded by a plus "+" or minus "−". Outbound URLs can be compared against the patterns in the order listed until a match is found. Once matched, the action taken may be dictated by the prefix. A minus "−" prefix blocks the URL from being passed out to another application. A plus "+" prefix permits the URL to be passed out to another application for handling. If neither "+" or "−" is provided with the pattern, a default action may be taken (e.g., allow is assumed). A pair of values separated by "=" may indicate a substitution where occurrences of the first string are replaced with the second. The regular-expression "^" prefix may be used to require the pattern to occur at the beginning of the URL. In some embodiments, if an outbound URL does not match any pattern in the list, it will be blocked. A similar filter setting could be constructed for an inbound network traffic filter.

By relying on a comprehensive metadata description of all policies and settings associated with managed applications that, in some embodiments, may be embedded within the application bundle itself, the administrative control point for the policies can dynamically compose user interface for these settings, thereby decoupling the back end EMM server software from the specific knowledge of policies to be offered.

Further, this data driven description of policy settings may simplify delivery of policy settings dynamically to an application at runtime without any middleware knowledge of the semantics of these settings.

Figure 8:
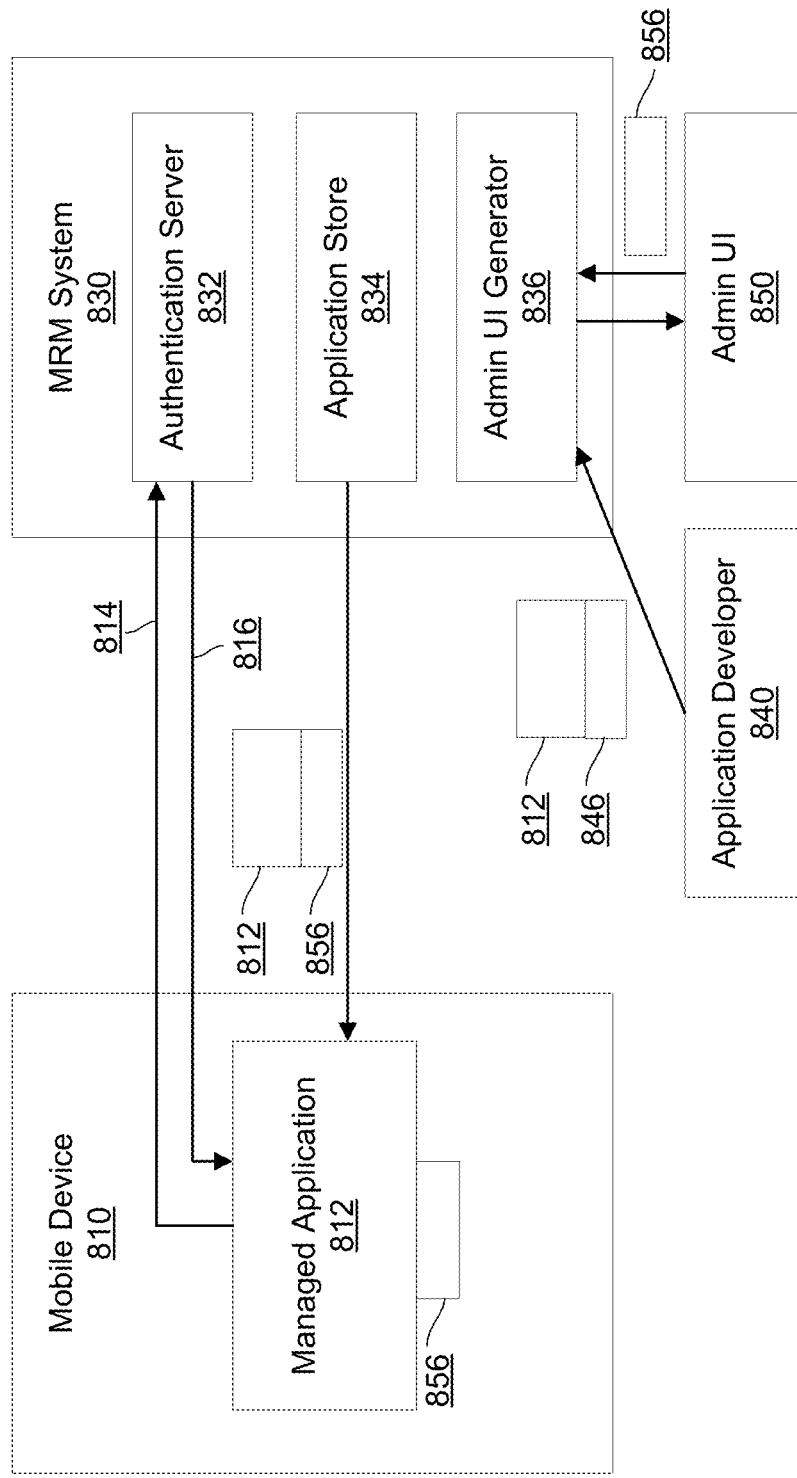
FIG. 8 illustrates an example environment in which various policies may be configured in accordance with one or more aspects described herein.

FIG. 8 illustrates an example environment in which various policies may be configured. The environment of FIG. 8 provide additional details not shown in FIGS. 5 and 6 and, specifically, show various aspects related to configuring policies for managed applications, as described herein (e.g., in connection with FIG. 7 and in connection with the below-described methods of the remaining figures). As shown, a mobile device 810 may communicate, e.g., over the Internet or some other network, with MRM system 830. The MRM system 830 may include, for example, an authentication server 832 (e.g., that provides authentication services, such as those described in connection with FIG. 5), an application store 834 (e.g., application store 578 of FIG. 5), and an administrative user interface generator 836, or any of the other components described above in connection with FIGS. 3 through 6 (e.g., MRM system 830 may include an access gateway or other component). Such other components are omitted from FIG. 8 for simplicity.

In some embodiments, an application developer 840 may develop an application 812 that is to be managed by one or more policies. The application developer may also produce initial policy metadata 846. The policy metadata 846 may define a set of policies for controlling data flow into and/or out of the managed application 812. In some instances, the policy metadata may include a first set of policy metadata that is general to the MRM system 830 and a second set of policy metadata that is specific to the managed application 812. The application developer 840 (or multiple developers) may develop multiple mobile applications, each with metadata general to the MRM system 830 and with application-specific metadata.

The managed application 812 and policy metadata 846 may be received at the MRM system 830 (e.g., received from application developer 812) and provided to other otherwise received by the administrative UI generator 836. Upon receiving the managed application 812 and policy metadata 846, the administrative UI generator 836 may dynamically generate an administrative UI 850. An administrator, such as an IT administrator, can then view the policy metadata 846 via a viewing component of UI 850 and customize the policy settings included in the policy metadata 846, e.g., based on rules of the MRM system 830 and/or other considerations. Subsequent to the administrator's customizations is policy 856, which may be an XML file, and may include one or more settings different from policy metadata 846 (e.g., policy metadata 846 may include a setting not included in policy 856, policy metadata 846 may not include a setting included in policy 856, etc.). In an example, the policy 856 may be in the form of a dictionary of policy names and values (e.g., key/values pairs), which may be included in an XML or JSON file, for example.

With the settings of the policy 856 established, the managed application 812 may be made available to users via the application store 834. Users, such as a user of the mobile device 810, can log on to the MRM system 830 by, for example, submitting authentication requests 814 to the authentication server 832 (e.g., via a MicroVPN tunnel and an access gateway, as illustrated in FIG. 5) and receiving authentication responses 816. Authenticated users can view applications in the application store 834 and download them to their mobile devices. For example, the user of the mobile device 810 can download the managed application 812 from the application store 834.

In some variations, when the user downloads the managed application 812, the user may also receive the policy 856. The application 812, based on software installed on the mobile device (e.g., the client agent as described in connection with FIG. 6) can then be executed in such a way as to constrain its operation on the mobile device 810 in accordance with the policy 856.

Additionally, the managed application 812 may be specially designed or adapted for use with the MRM system 830 or enterprise. In other words, the managed application can be considered to be not an application that general users can download for their own personal activities (e.g., news apps, Facebook app, etc.). In some examples, the managed application 812 may be designed especially for the MRM system 830. In other examples, the application 812 may be a widely used application that is adapted specifically for use with the MRM system 830. For example, the application 812 may be injected with additional code that enables the application to conform with the framework of the MRM system 830. Such code can be compiled into the application 812 using an SDK. Alternatively, such code may be applied as a wrapper around the general-use application. Such "wrapping" may provide one or more interfaces to adapt the application 812 specifically for use with the MRM system 830. In general, the additional code may, for example, divert application programming interface (API) calls from the application 812 through the policy 856, such that the policy 856 is applied to control the behavior of the application 812 on the mobile device 810.

The application developer(s) 840 can periodically provide updated versions of the policy metadata 846. Such updates can be used to generate (via the administrative UI generator 836) an updated version of policy 856. In some examples, the updated version of policy 856 can be pushed to the mobile device 810 to update the policy in use.

In some examples, the policy 856 residing on the mobile device 810 may be refreshed periodically, or in response to certain events, such as starting the application 812 on the mobile device 810, in response to a MicroVPN connection being created between the mobile device 810 and an access gateway of the MRM system 830, or in accordance with a setting of policy 856 that directs mobile device 810 to request an update to the policy 856.

Having described certain embodiments, numerous alternative embodiments or variations can be made. For example, the MRM system 830 has been shown and described as a server accessible via a network, such as the Internet, and may be implemented with both a server portion and a client portion that runs on the mobile device 810.

A policy may include any type of setting that an IT administrator or application developer may wish to implement for a managed application In connection with the numerous different settings that an IT administrator or application developer may wish to implement for a managed application, a few additional embodiments and variations will be described in connection with FIGS. 9 through 11.

For example, temporal and geographic restrictions on data access may be useful in some variations. Accordingly, an administrator may deploy a policy that restricts the availability of the data (stored within the container) to a specified time window and/or a geographic zone (e.g., as determined by a GPS chip of the mobile device) within which the mobile device must be currently located in order to access the data. Further, the policy can instruct deletion of data from the container or otherwise make them unavailable when the specified time period expires or if the mobile device is taken outside of the defined geographic zone. One example method for configuring and providing a policy that includes a setting to delete data will be discussed below in connection with FIG. 9.

As another example, it may be important to include settings that constrain or otherwise affect how the application is to be executed. For example, a policy may specify how data associated with the mobile application is to be stored by the mobile device and/or how file system APIs called by the application are to be redirected and/or how data associated with the mobile application is to be processed by the mobile device. One example method for configuring and providing a policy that includes one or more settings for managing execution of a managed application will be discussed below in connection with FIG. 10.

As another example, it may be important to include settings that are specific to a user's role in the enterprise, such as what department he or she is employed within the enterprise (e.g., sales, engineering, etc.). It may also be important to include settings related to authenticating a user when the mobile application is executing (e.g., a setting that specifies a token that can be used to authenticate a user when creating a MicroVPN connection specific to the managed application and that enables access by the mobile device/application to one or more resources that are accessible via an access gateway). One example method for configuring and providing a policy that includes one or more settings related to user authentication and/or user identification will be discussed below in connection with FIG. 11.

Figure 9:
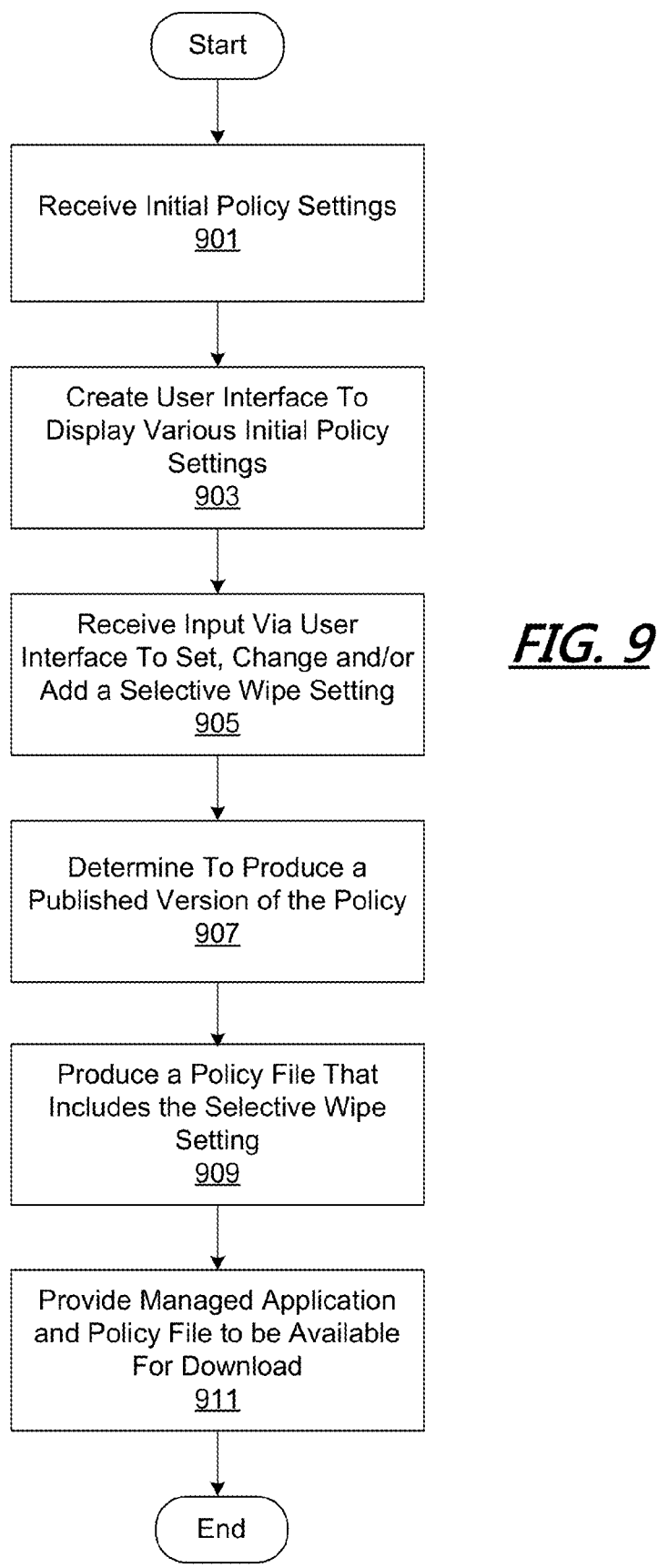
FIG. 9 illustrates an example method for configuring and providing a policy that includes a setting to delete data in accordance with various aspects of the disclosure.

FIG. 9 illustrates an example method for configuring and providing a policy that includes a setting to delete data in accordance with various aspects of the disclosure. Additionally, FIG. 9 illustrates a method that is performed by the processing circuitry of one or more computing devices—such as an access gateway, another server under control by an IT administrator of an enterprise, or another device acting as a control point—when operating in accordance with various software constructs.

At step 901, the one or more computing device may receive initial policy settings or other data for inclusion in a policy. This step may proceed similar to step 701 of FIG. 7.

At step 903, the one or more computing devices may create a user interface (UI) to display various portions of the initial policy settings. This step may proceed similar to step 703 of FIG. 7.

At step 905, the one or more computing device may receive input via the user interface to set, change, and/or add to one or more settings related to providing a selective wipe on a mobile device (e.g., a selective wipe setting). Aspects of this step may proceed similar to step 705 of FIG. 7.

An IT administrator may provide input specifying one or more conditions that, when not met by the mobile device, instruct deletion of data or instruct the mobile device to perform a selective wipe. For example, an IT administrator may provide input via the UI that specifies one or more temporal or geographic restrictions for data associated with the managed application. Accordingly, one or more policy settings may be set, changed and/or added to restrict the availability of data to a specified time window and/or a geographic zone (e.g., as determined by a GPS chip of the mobile device) within which the mobile device must be currently located in order to access data.

An IT administrator may provide input specifying one or more conditions that, when met by the mobile device, instruct deletion of data or instruct the mobile device to perform a selective wipe. For example, one or more settings may be set, changed and/or added via the UI that specify one or more operating conditions of the mobile device. Such operating conditions may include, for example, an attempt to jailbreak the mobile phone, install an application on a blacklist, a number of failed attempts to log-in to the mobile device, an attempt to uninstall the managed application, switch from a managed application to an unmanaged application, switch from the managed application being stored in a managed partition of the mobile device to an unmanaged partition, receive a message specifying that the user no longer is employed by the enterprise, or otherwise use the mobile device in a disallowed configuration. Other operating conditions may include deleting data according to a specified schedule (e.g., daily, weekly) or when a secure container has or exceeds a threshold amount of stored data. As the device is operated, software on the device may monitor for the one or more operating conditions and when the operating conditions are met, may perform a selective wipe or delete data from the mobile device in accordance with the policy setting. Further details as to how the mobile device performs a selective wipe or deletes data is described below in connection with step 909.

The IT administrator may also be able to set, change and/or add specific data that is to be deleted when performing the selective wipe. For example, a specific data container's identifier or resource name may be included in the policy setting so that any data stored in the data container (e.g., secure data container 528 of FIG. 5, the private data vault or shared data vault of FIG. 6, etc.). The policy setting may also specify that a user's mobile device is deleted of all enterprise application(s) and corporate data when performing the selective wipe based on the policy setting.

At step 907, the one or more computing devices may determine to produce one or more published versions of the policy. This step may proceed similar to step 707 of FIG. 7.

At step 909, the one or more computing devices may produce one or more policy files for the managed application that include the selective wipe setting. This step may proceed similar to step 709 of FIG. 7.

The policy file produced by this step can be used by the mobile device to enforce the selective wipe settings. Accordingly, the policy can cause the mobile device or application to perform various actions based on any selective wipe setting included in the policy file. Generally, any of the above (or other) conditions described above in connection with step 905 may form the basis for actions that the mobile device or application is caused to perform.

For example, if the mobile device does not meet the conditions of a selective wipe setting (or does meet conditions, depending on what type of constraint the setting applies), the mobile device may, in response, perform a selective wipe as defined by the selective wipe setting.

As one example, a selective wipe may be performed by the mobile device as follows. The mobile device may begin by monitoring the operating conditions of the mobile device (e.g., monitor for when the user discontinues employment, violates a corporate policy such as if they jailbreak their device or otherwise use it in a disallowed configuration, or the like). Based on any selective wipe setting included in the policy and the monitored conditions, the mobile device may determine to perform a selective wipe of data. For example, if a selective wipe setting specifies a number of failed attempts that result in performance of a selective wipe and the mobile device detects a sufficient number of consecutive failed attempts to enter a valid passcode (e.g., 5 or 10), the mobile device may determine to perform a selective wipe.

Generally, any of the above (or other) conditions described above in connection with step 907 may form the basis of the determination of when the mobile device performs a selective wipe. To enforce the policy, the mobile device may compare the monitored conditions to one or more policies and if the conditions match a condition specified in the policy that commands a selective wipe, the mobile device may determine to perform a selective wipe.

In some embodiments, the mobile device may perform a check to determine whether it has the most up to date policies that form a basis for performing the selective wipe. For example, in some instances, the mobile device may be performing a polling mechanism in a background thread that periodically polls for updates to the policies installed on the mobile device. In others, the mobile device may, prior to performing the selective wipe, send a message to the access gateway that indicates a selective wipe is about to be performed. In addition to indicating that the selective wipe is about to be performed, the message may include an indication of the version number of the policy that formed the basis for determining to perform the selective wipe. Responsive to receiving the message, the access gateway may determine whether the mobile device has the most-up-to date policy settings (e.g., determine whether the policy should be updated or not) and, based on the determination, may respond with an acknowledgement that indicates the mobile device has the most up-to-date policy settings or respond with an update to the policy. After receiving the message or update, the mobile device may proceed with performing the selective wipe or re-determine whether the selective wipe should be performed based on the updated policy.

The mobile device may continue the selective wipe process by, for example, determining one or more secure containers for the selective wipe. For example, the mobile device may determine which secure containers contain the data of the one or more managed applications. This determination may be based on information specified by the policy.

After determining to perform the selective wipe and determining which containers to delete from, the mobile device may delete or otherwise make inaccessible the data of the one or more secure containers in accordance with the policy. For example, a container may be configured to allow the client agent or mobile device to read from, write to, and/or delete information from the container's file system. Deleting data from the container can include deleting actual data stored in the container, deleting pointers to data stored in the container, deleting encryption keys used to decrypt data stored in the container, and the like. The container can enable some or all of the enterprise data stored in its file system to be deleted without modifying other data stored on the mobile device outside of the container.

After performing the selective wipe, the mobile device may transmit a selective wipe acknowledgement to the enterprise. Such an acknowledgement may provide an indication to the enterprise that the selective wipe was successful. The acknowledgement may include a listing of applications and/or listing of secure containers that were affected/deleted by the selective wipe. The acknowledgement may also include a version number of the policy that included the selective wipe settings so that a computing device (e.g., the access gateway) can confirm that the most up-to-date version of the selective wipe settings were used. Upon receipt, the enterprise (e.g., access gateway) may update its stored records accordingly.

At step 911, the one or more computing devices may provide the managed application and the policy file to be available for download by one or more mobile devices. This step may proceed similar to step 711 of FIG. 7.

Figure 10:
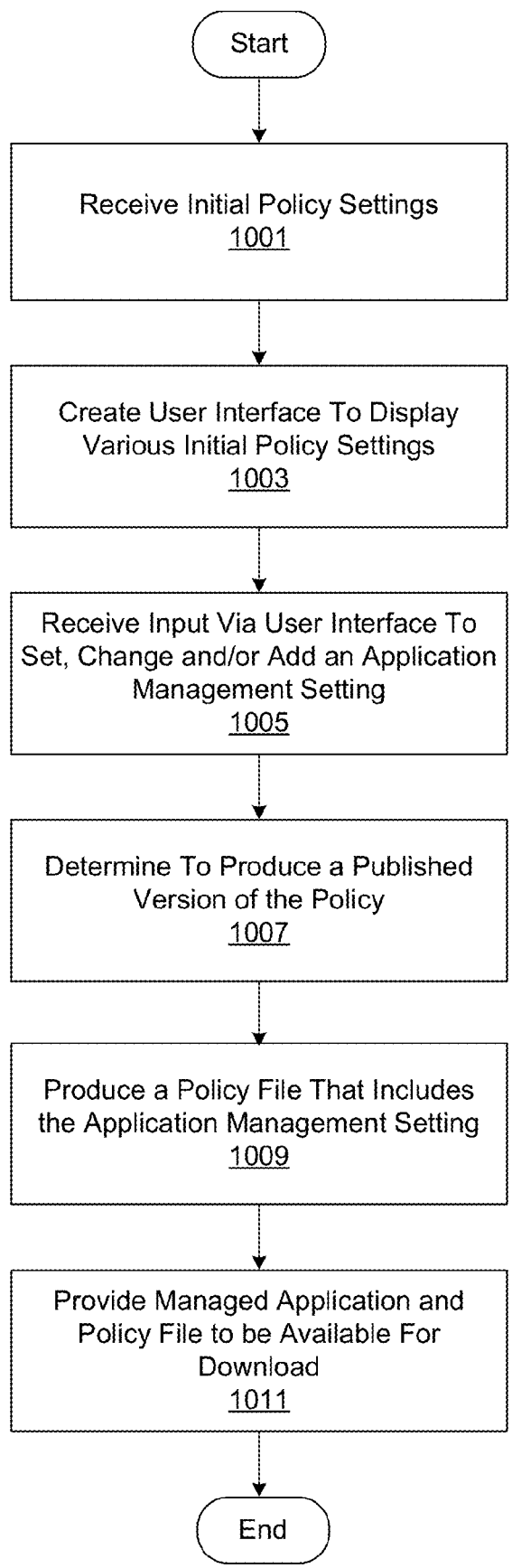
FIG. 10 illustrates an example method for configuring and providing a policy that includes one or more settings for managing execution of a managed application in accordance with one or more aspects of the disclosure.

FIG. 10 illustrates an example method for configuring and providing a policy that includes one or more settings related to application management of a managed application. Additionally, FIG. 10 illustrates a method that is performed by the processing circuitry of one or more computing devices—such as an access gateway, another server under control by an IT administrator of an enterprise, or another device acting as a control point—when operating in accordance with various software constructs.

At step 1001, the one or more computing device may receive initial policy settings or other data for inclusion in a policy. This step may proceed similar to step 701 of FIG. 7.

At step 1003, the one or more computing devices may create a user interface (UI) to display various portions of the initial policy settings. This step may proceed similar to step 703 of FIG. 7.

At step 1005, the one or more computing device may receive input via the user interface to set, change, and/or add one or more settings related to application management of a managed application (e.g., an application management setting). Aspects of this step may proceed similar to step 705 of FIG. 7.

In some arrangements, the UI administrator may provide input to set, change, or add a setting that specifies how data associated with the mobile application is to be stored by the mobile device and/or how file system APIs called by the application are to be redirected and/or how data associated with the mobile application is to be processed by the mobile device.

For example, the IT administrator may assign one or more secure containers to the mobile application. Accordingly, the policy may include one or more identifiers or resource names for the assigned secure container(s).

As another example, in some instances, the mobile device may have previously used a different application prior to using the managed application (e.g., a previous corporate e-mail application) and the previous application may not have enforced similar security settings that will be applied to the managed application (e.g., the previous corporate e-mail application did not encrypt the data of the inbox or the like).

Accordingly, one or more application management settings may be included in the policy so that legacy data will be processed when the application is configured in order to provide the user with access to the legacy data in accordance with the different security protocols being applied to the managed application.

An IT administrator may configure the policy so that, for example, it includes a location of the legacy data is defined within the policy and/or includes an indication that the mobile device is to transfer legacy data for the managed application when configuring the application. The policy may also define an amount of legacy data to move to the secure containers (e.g., a maximum amount of raw data, a number of days of e-mails, all data, etc.). In some arrangements, the legacy data may be stored remotely, such as by an enterprise resource.

The IT administrator may also provide input that specifies encryption and/or decryption keys for use when a mobile device or application wants to read, write or otherwise access a secure container on the mobile device when the managed application is running Such a policy may link a specified encryption/decryption key to one or more secure containers by specifying one or more secure container identifiers or resource names. For example, encryption or decryption keys may be assigned based on a tuple of user, device, and application or application group, and the policy may include information identifying the tuple (e.g., an identifier of the user, identifier of the mobile device, and identifier of the application or application group).

The IT administrator may also provide input that specifies how and/or how often the encryption and decryption keys should be updated or refreshed. For example, the setting may include a time to live for each key so that when the time expires, the mobile device must retrieve new keys via the access gateway. In some arrangements, such settings may also specify that the new keys are retrieved via an application specific VPN, such as a MicroVPN tunnel.

The IT administrator may also provide input that specifies which application group the managed application belongs to. Such an application management setting may include an identifier or resource name for a shared data vault that is accessible by other members of the application group.

The IT administrator may also provide input that specifies one or more secure data container that read or write operations from the managed application are to be redirected to when the mobile device executed the managed application. In some arrangements, one of the secure data containers may be a private secured data container that is accessible to only the managed application (e.g., the private app data vault of FIG. 6). In others, one or more of the secure data containers may be a shared data container (e.g., shared data vault of FIG. 6) that, for example, is accessible to applications of the same application group.

At step 1007, the one or more computing devices may determine to produce one or more published versions of the policy. This step may proceed similar to step 707 of FIG. 7.

At step 1009, the one or more computing devices may produce one or more policy files for the managed application that include the application management setting(s). This step may proceed similar to step 709 of FIG. 7.

The policy file produced by this step can be used by the mobile device to enforce the application management settings. Accordingly, the policy can cause the mobile device or application to perform various actions based on any application management setting included in the policy file. Generally, any of the above (or other) conditions described above in connection with step 1005 may form the basis for actions that the mobile device or application is caused to perform.

For example, when the mobile device configures the managed application, the mobile device may also configure one or more secure containers in accordance with the policy file. Based on the policy, the mobile device may determine whether the assigned containers have been properly created and configured on the mobile device. If a container does not already exist, a new empty vault is initialized, including a file system for the container (e.g., empty directory tree). An access manager for the container may also be configured. In some embodiments, a secure container can be a logical interface into which read or write operations are redirected and in which data is in an encrypted form. The access manager of a secure container may govern access to the file system by applications and other components of the mobile device.

A software component, such as the client agent of the mobile device, may also be configured based on the policy. For example, an interception layer may also be configured to be aware of any of the secure containers specified by the policy. To configure the interception layer, it may be configured with information linking the identifiers or resource identifiers for the secure containers to one or more API calls that will be issued by the application during execution and may be configured with the locations of the keys that will be used when encrypting/decrypting data to/from the application. In such a way, the interception layer may intercept such calls when the application is executing and redirect the calls to the appropriate secure container in accordance with the policy and, in some variations, without the application being aware of the interception.

If the policy specifies that legacy data for the managed application is to be configured for the application, the mobile device may perform such configuring of the legacy data accordingly. For example, the mobile device may retrieve, from the location where the legacy data is stored, and/or an amount of data in accordance with the policy. The mobile device may then encrypt the data in accordance with the policy (e.g., using the encryption protocols specified by the policy and using the keys specified by the policies). Some data may be encrypted using different keys based on which of the one or more secure containers they will be stored into. After encrypting the legacy data, the mobile device may store the now-encrypted legacy data into the specified secure container (as determined by the policy). In some instances, the policy may specify that some data is to be stored in one container (e.g., a private container), while other data is to be stored in a different container (e.g., a shared container). Accordingly, the data may be stored into the appropriate containers in their encrypted form. Such storage may be performed by updating or creating references to the location of the encrypted data in the secure container's file system. In some instances, after successfully processing the legacy data, any legacy data that remains on the mobile device in its unencrypted form may be deleted from the mobile device (such deletion may also be specified by the policy).

At step 1011, the one or more computing devices may provide the managed application and the policy file to be available for download by one or more mobile devices. This step may proceed similar to step 711 of FIG. 7.

Figure 11:
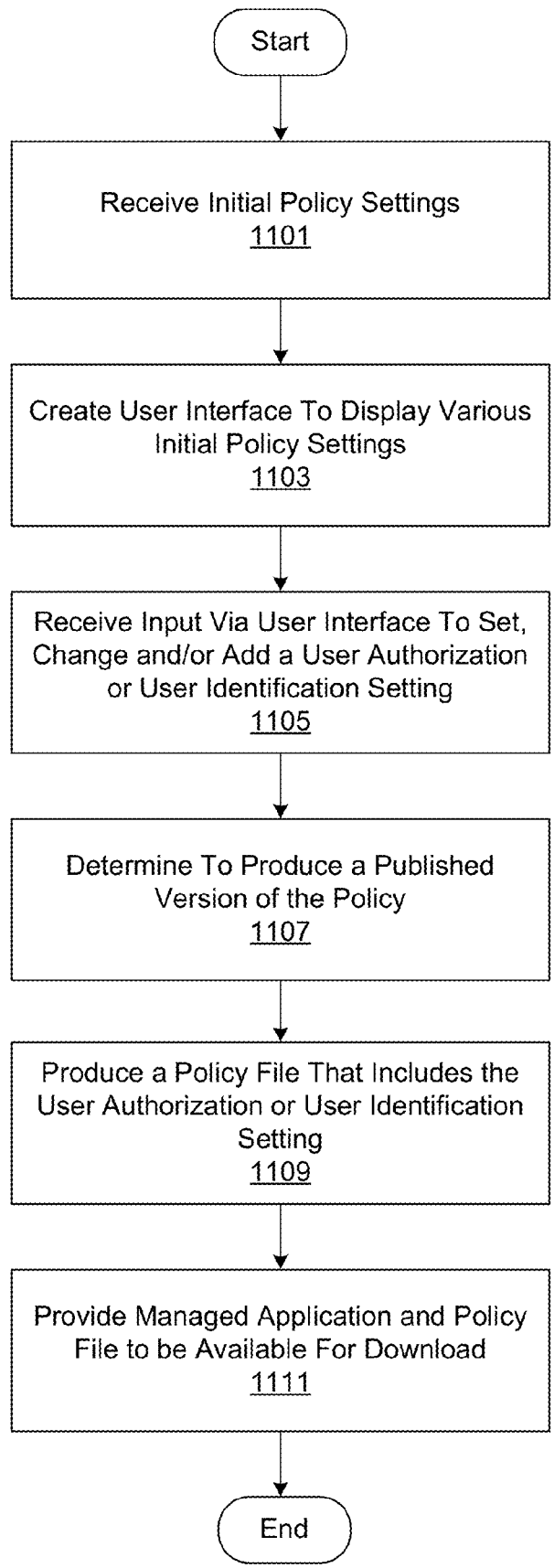
FIG. 11 illustrates an example method for configuring and providing a policy that includes one or more settings related to user authentication and/or user identification in accordance with various aspects described herein.

FIG. 11 illustrates an example method for configuring and providing a policy that includes one or more settings related to user authentication and/or user identification in accordance with various aspects described herein. Additionally, FIG. 11 illustrates a method that is performed by the processing circuitry of one or more computing devices—such as an access gateway, another server under control by an IT administrator of an enterprise, or another device acting as a control point—when operating in accordance with various software constructs.

At step 1101, the one or more computing device may receive initial policy settings or other data for inclusion in a policy. This step may proceed similar to step 701 of FIG. 7.

At step 1103, the one or more computing devices may create a user interface (UI) to display various portions of the initial policy settings. This step may proceed similar to step 703 of FIG. 7.

At step 1105, the one or more computing device may receive input via the user interface to set, change, and/or add a setting related to user authentication or user identification (e.g., a user authorization setting or a user identification setting). In some arrangements, such a setting may provide a condition for authorizing or identifying a user in connection with providing the access to one or more resources that are accessible through an access gateway. Aspects of this step may proceed similar to step 705 of FIG. 7.

In some arrangements, an IT administrator may set, change and/or add a setting that specifies (or includes) a ticket or token (these terms will be used interchangeably herein). Such tokens can be used by the mobile device in order to authenticate the user in a transparent manner. That is, one or more tickets are provided to the mobile device from the enterprise in an effort to avoid burdening the user to re-authenticate. When attempting to access an enterprise resource or initiating a secure connection to the enterprise resource, the mobile device may provide the ticket to the access gateway instead of reauthenticating (e.g., instead of requiring the user to input or otherwise provide his or her credentials, such as a username and/or password).

Such tickets, however, may expire and the IT administrator may specify the expiration time or expirations conditions of the ticket. If such tickets expire, operations that required tickets instead now require that the user re-authenticate. In some variations, a ticket may be one-time use and/or time-based, and impose constraints and/or privileges to the application or user when accessing an enterprise resource. For example, a ticket may be specified as valid for a two-week period, or some other shorter or longer time period as the enterprise operator wishes (e.g., provide short-lived or longer-lived access). In some arrangements, access control is structured so that the level of security diminishes over time. For instance, some applications which should have high security may be provided tickets that expire more quickly (e.g., after a predefined amount of time such as an hour, 15 minutes, etc.). Other tickets associated with applications of lower security may expire at a later time (e.g., after a later predefined amount of time such as a day, etc.). Other ticket-based techniques for imposing different levels of security based on time or other measure (e.g., number of logins) are suitable for use as well.

As one example of a ticket's use, a ticket may be usable to provide authentication in connection with creating a VPN tunnel to enterprise resources. For example, a ticket may include data or be otherwise configured to authenticate a user, mobile device or application that is attempting to create a VPN tunnel to an enterprise resource that is accessible through an access gateway, such as a MicroVPN tunnel or other type of application-specific VPN tunnel.

The IT administrator may also provide input via the UI that specifies how a user is to log-on to the MRM system. For example, the policy may specify that the user can use single-sign on functionality for authentication with the access gateway and the conditions with which the user can continue using single sign on functionality (e.g., single sign on within particular geographic or mobile device location constraints, within particular time windows, constraints requiring an install of a particular application on the mobile device, or the like).

As discussed above, when a user executes a managed application on the mobile device, the user is typically challenged to authenticate their corporate identity along with passwords and other factors as dictated by corporate policy. The policy may specify the constraints on the password and/or specify the types of identification information that is to be included when requesting to authenticate (e.g., authenticate with a password, username and mobile device identifier).

The policy may also specify (or include) one or more certificates that can be used to respond to certificate challenges that are received by the mobile device.

The IT administrator may also provide input via the UI to create a policy that is assigned to the user's role within the enterprise or specific to the application's assigned application group. In such a way a single managed application may be associated with multiple policies, with each policy being assigned to a different user role (e.g., one policy for a sales employee; a different policy for a designer, etc.) or application group (e.g., a managed application may be assigned to multiple application groups where each provides various constraints or benefits to member applications, such as shared access to data stored in data containers, or the like, and each of the multiple application groups corresponds to a different user role).

A policy may also be assigned to a group of applications. The group of applications could be, for example, a grouping of applications that apply to a particular industry (e.g., the policy is assigned to a group of applications that are related to the healthcare industry), apply to a particular organization (e.g., the policy is assigned to a group of applications that were created by the same application developer, or are provided by the same enterprise), and the like. The UI may be configured to allow the IT administrator to provide input to create such assignments.

At step 1107, the one or more computing devices may determine to produce one or more published versions of the policy. This step may proceed similar to step 707 of FIG. 7.

At step 1109, the one or more computing devices may produce one or more policy files for the managed application that include the user authentication or user identification setting(s). This step may proceed similar to step 709 of FIG. 7.

The policy file produced by this step can be used by the mobile device to enforce the user authentication or user identification settings. Accordingly, the policy can cause the mobile device or application to perform various actions based on any user authentication or user identification setting included in the policy file. Generally, any of the above (or other) conditions described above in connection with step 1105 may form the basis for actions that the mobile device or application is caused to perform.

For example, a ticket specified by the policy may be first loaded into the mobile device when the policy is downloaded to the mobile device. The mobile device may transmit a message including the ticket when attempting to create an application-specific VPN tunnel. If such token/ticket has expired, then the user may be asked to proceed through a full authentication process again before allowing VPN access. If the ticket is not expired, the information included in the ticket may be used by a computing device (e.g., access gateway) to determine that the ticket is valid and the user is allowed to access resources that are accessible via the access gateway. After using the ticket to authenticate the user, a VPN tunnel between the access gateway and mobile device may be constructed/initialized that enables the mobile device with access to at least one resource. The VPN tunnel may be an application specific VPN, such as a MicroVPN.

Use of the user authorization or user identification settings may, in some embodiments, cause the mobile device to be able perform various actions without the application and/or the user being aware of the authorization or that the user identification was provided to the enterprise. For example, the creation of the application specific VPN tunnel may be done without user interaction and without the user's knowledge that the application specific VPN tunnel has been created/established. As another example, certificates specified by the policy may be provided without the application or user being aware that such information was provided. As yet another example, user log-ins, passwords, or other identifying information may be provided to the enterprise without the user or application being aware that such information was provided.

At step 1111, the one or more computing devices may provide the managed application and the policy file to be available for download by one or more mobile devices. This step may proceed similar to step 711 of FIG. 7.

Although the subject matter has been described in language specific to structural features and/or methodological acts, it is to be understood that the subject matter defined in any claim is not necessarily limited to the specific features or acts described above. Rather, the specific features and acts described above are described as some example implementations of the following claims.

We claim:

1. A method, comprising:
analyzing a managed application to determine policy settings for the managed application, wherein the managed application is to be made available for download to a mobile device, wherein each of the one or more policy settings provides a constraint to be enforced by the mobile device prior to the managed application being provided access to at least one resource that is accessible through an access gateway, wherein the policy settings include at least one first setting specifying that a private secure container, which is to be private to the managed application, is to be configured on the mobile device such that a read or write operation from the managed application is to be redirected to the private secure container, and wherein the policy settings includes at least one second setting specifying that a shared secure container, which is to be accessible by at least one other managed application, is to be configured on the mobile device such that a read or write operation from the managed application is to be redirected to the shared secure container;
displaying, by one or more computing devices, a user interface that displays the policy settings;
receiving input via the user interface that creates or modifies an application management setting of the policy settings, wherein the application management setting specifies how data associated with the managed application is to be processed by the mobile device in connection with the managed application;
producing a policy file for the managed application that includes the application management setting, the at least one first setting, and the at least one second setting; and
providing the policy file such that the policy is available for download to the mobile device.

2. The method of claim 1, wherein the policy file is an Extensible Markup Language (XML) file or a JavaScript Object Notation (JSON) file, wherein the policy file includes one or more key/value pairs organized as a dictionary, and wherein one key/value pair of the one or more key/value pairs corresponds to application management setting.

3. The method of claim 1, wherein the application management setting includes a setting group or category identifier; a setting dictionary name; a setting type; a range of possible setting values; a default setting value; a setting friendly name string; a setting unit display string; and a help text string.

4. The method of claim 1, wherein the application management setting includes data specifying: one or more encryption or decryption keys for use when reading or writing to the private secure container or the shared secure container; information that identifies a basis for assigning the one or more encryption or decryption keys; information that identifies when each of the one or more encryption or decryption keys is to be updated by the mobile device; or information that identifies the mobile device is to use an application specific virtual private network (VPN) tunnel with the access gateway to retrieve the one or more encryption keys.

5. The method of claim 4, wherein the user interface is configured to accept input specifying: the one or more encryption or decryption keys; the information that identifies the basis for assigning the one or more encryption keys; the information that identifies when each of the one or more encryption keys is to be updated by the mobile device; and the information that identifies the mobile device is to use the application specific VPN tunnel with the access gateway to retrieve the one or more encryption keys.

6. The method of claim 1, wherein the application management setting includes data specifying an identifier or a resource name of the private secure container.

7. The method of claim 1, further comprising:
assigning the policy file to a group of applications.

8. The method of claim 1, wherein the providing the policy file includes publishing the policy file to an application store that also publishes the managed application.

9. The method of claim 1, wherein providing the policy file includes pushing the policy file to the mobile device based on the mobile device being registered with a push service.

10. The method of claim 1, wherein the application management setting includes data specifying that, as part of a process of configuring the managed application, unencrypted legacy data, which is associated with an application of the mobile device that was executed according to security protocols different from those specified by the policy settings, is to be encrypted and stored in the private secure container or the shared secure container.

11. An apparatus, comprising:
at least one processor; and
memory storing executable instructions configured to, when executed by the at least one processor, cause the apparatus to:
analyze a managed application to determine policy settings for the managed application, wherein the managed application is to be made available for download to a mobile device, wherein each of the policy settings provides a constraint to be enforced by the mobile device prior to the managed application being provided access to at least one resource that is accessible through an access gateway, wherein the policy settings include at least one first setting specifying that a private secure container, which is to be private to the managed application, is to be configured on the mobile device such that a read or write operation from the managed application is to be redirected to the private secure container, and wherein the policy settings includes at least one second setting specifying that a shared secure container, which is to be accessible by at least one other managed application, is to be configured on the mobile device such that a read or write operation from the managed application is to be redirected to the shared secure container;

display a user interface that displays the policy settings;

receive input via the user interface that creates or modifies an application management setting of the policy settings, wherein the application management setting specifies how data associated with the managed application is to be processed by the mobile device in connection with the managed application;

produce a policy file for the managed application that includes the application management setting, the at least one first setting, and the at least one second setting; and provide the policy file such that the policy is available for download to the mobile device.

12. The apparatus of claim 11, wherein the policy file is an Extensible Markup Language (XML) file or a JavaScript Object Notation (JSON) file, wherein the policy file includes one or more key/value pairs organized as a dictionary, and wherein one key/value pair of the one or more key/value pairs corresponds to application management setting.

13. The apparatus of claim 11, wherein the application management setting includes a setting group or category identifier; a setting dictionary name; a setting type; a range of possible setting values; a default setting value; a setting friendly name string; a setting unit display string; and a help text string.

14. The apparatus of claim 11, wherein the user interface is configured to accept input specifying: one or more encryption or decryption keys for use when reading or writing to the secure container; information that identifies a basis for assigning the one or more encryption or decryption keys; information that identifies when each of the one or more encryption or decryption keys is to be updated by the mobile device; and information that identifies the mobile device is to use an application specific virtual private network (VPN) tunnel with the access gateway to retrieve the one or more encryption keys.

15. The apparatus of claim 11, wherein the application management setting includes data specifying an identifier or a resource name of the private secure container.

16. The apparatus of claim 11, wherein the executable instructions are configured to, when executed by the at least one processor, cause the apparatus to:

assign the policy file to a group of applications.

17. The apparatus of claim 11, wherein the providing the policy file includes publishing the policy file to an application store that also publishes the managed application.

18. The apparatus of claim 11, wherein providing the policy file includes pushing the policy file to the mobile device based on the mobile device being registered with a push service.

19. One or more non-transitory computer-readable media storing instructions configured to, when executed, cause at least one computing device to:

analyze a managed application to determine policy settings for the managed application, wherein the managed application is to be made available for download to a mobile device, wherein each of the policy settings provides a constraint to be enforced by the mobile device prior to the managed application being provided access to at least one resource that is accessible through an access gateway, wherein the policy settings include at least one first setting specifying that a private secure container, which is to be private to the managed application, is to be configured on the mobile device such that a read or write operation from the managed application is to be redirected to the private secure container, and wherein the policy settings includes at least one second setting specifying that a shared secure container, which is to be accessible by at least one other managed application, is to be configured on the mobile device such that a read or write operation from the managed application is to be redirected to the shared secure container;

display a user interface that displays the policy settings;

receive input via the user interface that creates or modifies an application management setting of the policy settings, wherein the application management setting specifies how data associated with the managed application is to be processed by the mobile device in connection with the managed application;

produce a policy file for the managed application that includes the application management setting, the at least one first setting, and the at least one second setting; and provide the policy file such that the policy is available for download to the mobile device.

20. The one or more non-transitory computer-readable media of claim 19, wherein the policy file is an Extensible Markup Language (XML) file or a JavaScript Object Notation (JSON) file, wherein the policy file includes one or more key/value pairs organized as a dictionary, and wherein one key/value pair of the one or more key/value pairs corresponds to application management setting.

* * * * *